US006535307B1

(12) United States Patent
Allen et al.

(10) Patent No.: US 6,535,307 B1
(45) Date of Patent: Mar. 18, 2003

(54) METHOD AND APPARATUS FOR DISPLAY OF IMAGING PARAMETERS

(75) Inventors: Roy D. Allen, Burlington, MA (US); David J. Romano, Lowell, MA (US); Stephen C. Hinds, Andover, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/206,217

(22) Filed: Dec. 5, 1998

Related U.S. Application Data

(63) Continuation-in-part of application No. 08/800,937, filed on Feb. 13, 1997.
(60) Provisional application No. 60/099,881, filed on Sep. 11, 1998.

(51) Int. Cl.$^7$ ................................................. H04N 1/46
(52) U.S. Cl. ...................................... 358/504; 358/406
(58) Field of Search ................................. 358/406, 504, 358/1.9, 450, 540; 400/74; 283/72, 85

(56) References Cited

U.S. PATENT DOCUMENTS

| 4,004,923 A | 1/1977 | Hensel |
| 4,183,990 A | 1/1980 | Uchida et al. |
| 4,273,045 A | 6/1981 | Crowley |
| 4,310,248 A | 1/1982 | Meredith |
| 4,419,426 A | 12/1983 | Kehl |

(List continued on next page.)

FOREIGN PATENT DOCUMENTS

| CH | 681929 A5 | 6/1993 |
| EP | 0518559 A | 6/1992 |
| EP | 0518525 | 12/1992 |
| FR | 2206868 | 5/1974 |

OTHER PUBLICATIONS

Schmitt, "Fogra Mitt", 43(148);22–24 (Aug. 1994).
Schmitt, "Fogra Mitt", 42(147);19–26 (Dec. 1993).
Munger, K., "the UGRA/FOGRA Digital Control Wedge and Its Application", pp. 48–61.

(List continued on next page.)

*Primary Examiner*—Thomas D. Lee
(74) *Attorney, Agent, or Firm*—Ira V. Heffan; Mark L. Beloborodov

(57) ABSTRACT

A visual sensor has a first portion and a second portion. The sensor is able to detect the state of one or more imaging parameters such as exposure setting, pulse width modulation, focus, balance, spot ellipticity, sidelobe size, shape, and intensity, media gamma, edge sharpness, dot gain, uniformity, ink receptivity, physical changes in the media, pattern dependent effects such as dot gain or tone resolution compared to the type of halftone used, and sensitivity to calibrated position or exposure errors. The first image portion has a first imaging characteristic, and the second image portion has a second imaging characteristic. Imaging characteristics are characteristics of an image, including, but not limited to apparent density level, tint, color, reflectivity, absorption, granularity or microstructure, size, shape, distribution, degree of randomness, structure, edge sharpness, and depth or dimension. One of the portions is less sensitive to one or more imaging parameters than the other portion so that the first image portion and the second image portion appear substantially similar at a desired range of imaging parameters, and appear different otherwise. The imaging characteristic of the first portion is distinguishable from the imaging characteristic of the second portion for one or more ranges of one or more imaging parameters, and is not distinguishable for the alternate range(s) of the one or more imaging parameters. A range can be a particular imaging parameter value, or a range that excludes one or more imaging parameter values.

27 Claims, 13 Drawing Sheets

U.S. PATENT DOCUMENTS

| | | |
|---|---|---|
| 4,504,141 A | 3/1985 | Yamakoshi |
| 4,532,596 A | 7/1985 | Pugsley |
| 4,534,288 A | 8/1985 | Brovman |
| 4,546,700 A | 10/1985 | Kishner et al. |
| 4,588,298 A * | 5/1986 | Nakamura .................. 356/443 |
| 4,679,071 A | 7/1987 | Kitagawa |
| 4,852,485 A | 8/1989 | Brunner |
| 4,913,049 A | 4/1990 | Sainio |
| 5,031,534 A | 7/1991 | Brunner |
| 5,056,430 A | 10/1991 | Bayerlein et al. |
| 5,138,667 A | 8/1992 | Roch et al. |
| 5,160,845 A | 11/1992 | Stumbo et al. |
| 5,227,815 A | 7/1993 | Dastin et al. |
| 5,237,394 A | 8/1993 | Eaton |
| 5,434,604 A | 7/1995 | Cleary et al. |
| 5,493,321 A | 2/1996 | Zwaldo |
| 5,530,460 A | 6/1996 | Wehl |
| 5,598,272 A * | 1/1997 | Fisch et al. ................. 358/504 |
| 5,636,330 A | 6/1997 | Barak |
| 5,857,784 A | 1/1999 | Allen |
| 6,128,090 A * | 10/2000 | Hunsel et al. .............. 356/402 |

OTHER PUBLICATIONS

"GAFT/Systems of Merritt, Digital Plate Control Target".

Sabotka et al., "A Special VFG–GLV Test Target for Postscript Output devices", pp. 63–74.

R. Allen, "Registration method for providing high visual magnification of micro–position errors", Color Hard Copy and Graphic Arts II, SPIE Proceedings Series, vol. 3018, pp. 389–397, Feb. 1997.

R. Levien, "Highly sensitive register mark based on moire patterns", Color Hard Copy and Graphic Arts II, SPIE Proceedings Series, vol. 1912, pp. 423–427, Feb. 1993.

R. Allen, "Visual Tools, Image Quality Measurement without Instrumentation", Sep. 7–11, 1998, pp. 168–173 (ICPS 1998) vol. 2 of Proceedings.

* cited by examiner

METHOD AND APPARATUS FOR DISPLAY OF IMAGING PARAMETERS

CROSS-REFERENCE TO RELATED APPLICATIONS

This is a continuation-in-part of U.S. patent application Ser. No. 08/800,937 filed Feb. 13, 1997, and claims priority to provisional application No. 60/099,881 filed Sep. 11, 1998.

TECHNICAL FIELD

This invention relates to digital imagesetting and, more particularly, to visual sensors for detecting imaging parameters.

BACKGROUND INFORMATION

Printing presses use plates to print ink onto paper and other media. One method used for creating plates is to expose photosensitive film with the matter to be printed. When the film is developed, the matter imaged on the film may be imaged onto a photosensitive plate, sometimes referred to as "burning" a plate. After processing, the plate can be used on a press to print the matter onto a medium. Part of the plate, usually the part defining the image to be printed, retains ink, while the other part of the plate does not. When the plate is introduced to ink and then to paper or other medium, the image is printed on the medium.

In a black and white printing job, there is usually one plate that is used to print black ink. In a color printing job, a different plate may be used for each color ink. A color job may use three colors of ink, usually cyan, magenta, and yellow, which in combination can be used to make other colors. A plate is usually produced for each color ink. Often, in addition to cyan, magenta, and yellow, black ink is also used. An additional plate is then required to print the black ink. Occasionally, one or more colors will be printed separately as well, referred to as a "spot color." That color will also have its own plate.

Electronic prepress systems have used an imagesetter to receive raster data associated with a plate and to image the raster data onto photosensitive film. In this context, a raster may specify an image by pixels in columns and rows, at a predefined resolution. The film is then used to create a plate. The imagesetter exposes the photosensitive film pixel by pixel. One way that imagesetters image the raster data is to scan a laser across and down a piece of film. Electronics control the laser to expose, or refrain from exposing, each pixel in the raster data. The imagesetter images the pixels on the film in a manner that is precise and repeatable. Recently, platesetters also have been used to create plates directly from raster data without the use of intermediate film. Imagesetters, platesetters and like print engines, including proofers, are also referred to generally as output devices and writing engines.

Modem output devices may write or record images on various media used in image reproduction, including but not limited to photo or thermal sensitive paper or polymer films, photo or thermal sensitive coatings, erasable imaging materials or ink receptive media mounted onto an image recording surface, polymer film or aluminum based printing plate materials. Such media are mounted onto a recording surface which may be planar or curved.

Conventional digital imagesetters include a raster image processor (RIP) which receives signals representing an image to be recorded on the applicable media and converts the signals into instructions to a scanner which scans the recording media to produce the desired image. It is the function of the RIP to process the received signals representing the image into a corresponding instruction set that can be understood by the scanner.

In an article entitled "How to Calibrate and Linearize an Imagesetter Using the Digital UGRA/FOGRA Wedge" by Franz Sigg and David Romano, published in the Society for Imaging Science and Technology Proceeding of the Fourth Technical Symposium on Prepress Proofing and Printing, October 1995, pp. 88–92, which was co-authored by David Romano who is also a co-inventor of the invention described herein, the need for imagesetter predictability and repeatability is discussed. As noted in the article, most modem imagesetters require adjustment so that a pre-specified solid density associated with the media to be imaged is produced. In most cases, it is required that the imagesetter be adjusted until a solid density is obtained on the medium being recorded. A densitometer can be utilized to measure the density of a recorded image to ensure correspondence with the pre-specified density. A densitometer measure within the range 1.0–4.0 or more is generally considered a solid density.

In practice, there are many imaging parameters, including scanner intensity that can be adjusted to change the density of a recorded image. However, because the intensity adjustment does not guarantee that desired dot areas will actually be recorded on the medium, it has been proposed that linearization curves be utilized to further adjust the imagesetter to offset the dot gain on the medium recorded by the imagesetter which is typically experienced as the intensity of the scanner is increased. In this way, the size or number of dots within an image are modified so that the desired dot areas will actually be recorded on the imaged medium. However, utilizing linearization curves does not ensure proper exposure. Although the use of linearization curves, may result in proper dot areas, the adjustments made to obtain the desired density may also result in undesirable dot fringe or fog between the dots on the recorded medium.

In the above-referenced Sigg and Romano article, it is proposed that half-tone patterns formed of one-by-one, two-by-two and four-by-four pixel checkerboards be compared with a 50% half-tone patch to calibrate the imagesetter. More particularly, it was disclosed that the proper imagesetter exposure occurs when the three checkerboards and a 50% half-tone patch have the same darkness or tint and hence the same visual density.

In non-digital platemaking, its is well known to form continuous gray tone wedges with a plurality of continuous tone density patches on a separate sheet of medium to compare with a test or registration patch formed on the recorded medium to initially set the exposure of the platemaker and/or to confirm that teach individual sheet of recorded medium includes a test patch which matches the selected patch on the wedge. Such a wedge is depicted in prior art FIG. 1.

As shown in FIG. 1, the wedge 10 includes various continuous tone density patches 20 which are numbered 1–13 on the wedge. The densities of the respective patches vary from 0.15 D–0.195 D in steps of 0.15 D where D represents optical density. Other fields, which are not relevant for purposes of the present disclosure, are also included on the wedge 10. The patches 20 are formed on a medium 30 which is preferably of a material substantially similar to the medium to be production imaged and on which the test patch is to be recorded. The platemaker operator is instructed which of the particular step(s) on the wedge 10, and therefore which of the specific patch or patches within the continuous tone density patches 20 the test patch recorded on each piece of production medium must correspond to in order to be acceptable.

In a typical operational setting, a range of steps, e.g., 4, 5 and 6, might be designed for use in initially establishing the exposure setting for the platemaker or in monitoring the acceptability of recorded media and hence the repeatability of the platemaker. The wedge 10 provides a simple way in which to initially set the recorded media in non-digital platemakers. Although providing a rough indicator for initially establishing an acceptable platemaker exposure setting and for monitoring platemaker repeatability by ensuring that all recorded media is exposed at approximately the same level, the wedge 10 cannot ensure that the recorded test patch actually corresponds to a desired density. In any event, may of the operators now operating digital platesetters and imagesetters were trained on non-digital platemakers and are familiar with the use of the FIG. 1 wedge for quality control.

Density is an example of one imaging quality parameter. An output device may have several imaging parameters, including, but not limited to, focus, spot size, spot side lobe size, addressability, and pulse width modulation. Depending on the design of a writing engine, it may be possible to adjust imaging parameter settings with software configuration or by hardware configuration or adjustment. Some imaging parameters may be modified by the writing engine operator, other imaging parameters may be modified by field service, other imaging parameters are set in the manufacturing facility during production. It may not be possible to adjust a particular imaging parameter in a particular writing engine. The image qualification process for a writing engine often requires the output of many pages of photocopy and a substantial amount of time on copy measurement tools for interpretation. Media use and measurement time add cost to writing engine manufacturing and to maintenance and problem diagnosis.

In addition, proper exposure setup of some media, such as plate material, require a comparison of several variables simultaneously, some of which are difficult to measure on the media itself with traditional tools. Plate material setup must be optimized for on-press performance and not just for a density operating point on the media itself.

SUMMARY OF THE INVENTION

In general, in one aspect, the invention features a visual sensor having a plurality of portions including a first portion and a second portion. The sensor is able to detect the state of one or more imaging parameters such as exposure setting, pulse width modulation, focus, balance, spot size and shape, spot ellipticity, sidelobe size, sidelobe shape, and sidelobe amplitude, media transfer function and gamma, edge sharpness, dot gain, uniformity, ink receptivity, physical changes in the media, pattern dependent effects such as dot gain or tone resolution compared to the type of halftone used, and sensitivity to calibrated position or exposure errors. The first image portion has a first imaging characteristic, and the second image portion has a second imaging characteristic. Imaging characteristics are characteristics of an image, including, but not limited to apparent density level, tint, color, reflectivity, absorption, granularity or microstructure, size, shape, distribution, degree of randomness, structure, edge sharpness, and depth or dimension. One of the portions is less sensitive to one or more imaging parameters than the other portion so that the first image portion and the second image portion appear substantially similar at a desired range of imaging parameters, and appear different otherwise. The imaging characteristic of the first portion is distinguishable from the imaging characteristic of the second portion for one or more ranges of one or more imaging parameters, and is not distinguishable for the alternate range(s) of the one or more imaging parameters. A range can be a particular imaging parameter value, or a range that excludes one or more imaging parameter values.

Embodiments of this aspect of the invention include the following features. In one embodiment, the one of the first and second portions comprises a coarse tint and the other of the first and second portions comprises a fine tint. In one embodiment, the coarse tint is a (n×n) periodic pattern and the fine tint is a (m×m) periodic pattern such that (n>m). In another embodiment, the imaging parameter is at least one parameter chosen from the set of exposure setting, pulse width modulation, focus, balance, spot size, spot shape, spot ellipticity, sidelobes size, sidelobes shape, sidelobes intensity, media gamma, edge sharpness, dot gain, uniformity, ink receptivity of plate material, physical media changes, pattern dependent effects, sensitivity to position errors, and sensitivity to exposure errors. In one embodiment, the first and second imaging characteristics each comprise one or more characteristics chosen from the set of density, tint, color, reflectivity, absorption, granularity, microstructure, size, shape, distribution, randomness, structure, shape, edge sharpness, and depth. In another embodiment, one of the first and second portions comprises a symbol and the other of the first and second portions comprises a background. In another embodiment, the symbol comprises at least one alphanumeric character. In another embodiment, the symbol is a shape chosen from the set of arrow, circle, square, rectangle, triangle, diamond, pentagon, and octagon. In another embodiment, the symbol is chosen to provide information related to the at least one imaging parameter setting range.

In another aspect, the invention features a method for imaging a visual sensor. The method includes defining an image having a first portion and a second portion proximate to the first portion. The first portion has a first imaging characteristic, and the second portion has a second imaging characteristic such that one of the first and second portions is less sensitive to an imaging parameter than the other of the first and second portions. The method includes imaging the image such that the first portion and the second portion appear substantially similar for at least one desired imaging parameter setting range and appear different otherwise.

In one embodiment, one of the first and second portions comprises a coarse tint and the other of the first and second portions comprises a fine tint. In another embodiment, the coarse tint is a (n×n) periodic pattern and the fine tint is a (m×m) periodic pattern such that (n>m). In another embodiment, the imaging parameter is at least one parameter chosen from the set of exposure setting, pulse width modulation, focus, balance, spot size, spot shape, spot ellipticity, sidelobes size, sidelobes shape, sidelobes intensity, media gamma, edge sharpness, dot gain, uniformity, ink receptivity of plate material, physical media changes, pattern dependent effects, sensitivity to position errors, and sensitivity to exposure errors. In another embodiment, the first and second imaging characteristics each comprise one or more characteristics chosen from the set of density, tint, color, reflectivity, absorption, granularity, microstructure, size, shape, distribution, randomness, structure, shape, edge sharpness, and depth. In another embodiment, one of the first and second portions comprises a symbol and the other of the first and second portions comprises a background. In another embodiment, the symbol comprises at least one alphanumeric character. In another embodiment, the symbol comprises a shape chosen from the set of arrow, circle, square, rectangle, triangle, diamond, pentagon, and octagon. In another embodiment, the symbol is chosen to provide information related to the at least one imaging parameter setting range.

In another aspect, the invention features an array of visual sensors. The array includes two or more sensors, each sensor having a first portion having a first imaging characteristic and a second portion proximate to the first portion having a second imaging characteristic. The imaging characteristic of one of the first and second portions is less sensitive to an imaging parameter than the imaging characteristic of the other of the first and second portions, such that the imaging characteristic of the first portion and the second portion appear substantially similar for at least one imaging parameter setting range and appear different otherwise. The plurality of sensors are imaged at at least two different imaging parameter settings. In one embodiment, one of the first and second portions comprises a coarse tint and the other of the first and second portions comprises a fine tint. In one embodiment, the coarse tint is a (n×n) periodic pattern and the fine tint is a (m×m) periodic pattern such that (n>m). In another embodiment, one of the first and second portions is an aperiodic pattern. In another embodiment, one of the first and second portions is imaged using random screening. In one embodiment, the imaging parameter is at least one parameter chosen from the set of exposure setting, pulse width modulation, focus, balance, spot size, spot shape, spot ellipticity, sidelobes size, sidelobes shape, sidelobes intensity, media gamma, edge sharpness, dot gain, uniformity, ink receptivity of plate material, physical media changes, pattern dependent effects, sensitivity to position errors, and sensitivity to exposure errors. In one embodiment, the first and second imaging characteristics each comprise one or more characteristics chosen from the set of density, tint, color, reflectivity, absorption, granularity, microstructure, size, shape, distribution, randomness, structure, shape, edge sharpness, and depth. In one embodiment, one of the first and second portions comprises a symbol and the other of the first and second portions comprises a background. In one embodiment, the symbol is chosen to provide information related to the at least one imaging parameter setting range.

In another aspect, the invention features a method for imaging an array of sensors. The method includes imaging a sensor by defining an image having a first portion and a second portion proximate to the first portion. The first portion has a first imaging characteristic and the second portion has a second imaging characteristic such that one of the first and second portions is less sensitive to an imaging parameter than the other of the first and second portions. The method includes imaging the image so that the first portion and the second portion appear substantially similar for at least one desired imaging parameter setting range and appear different otherwise. The method further includes modifying the imaging parameter after the sensor is imaged, and repeating the imaging and modifying steps for a range of imaging parameter values.

In one embodiment, one of the first and second portions comprises a coarse tint and the other of the first and second portions comprises a fine tint. In another embodiment, the coarse tint is a (n×n) periodic pattern and the fine tint is a (m×m) periodic pattern such that (n>m). In another embodiment, one of the first and second portions is an aperiodic pattern. In another embodiment, one of the first and second portions is imaged using random screening. In another embodiment, the imaging parameter is at least one parameter chosen from the set of exposure setting, pulse width modulation, focus, balance, spot size, spot shape, spot ellipticity, sidelobes size, sidelobes shape, sidelobes intensity, media gamma, edge sharpness, dot gain, uniformity, ink receptivity of plate material, physical media changes, pattern dependent effects, sensitivity to position errors, and sensitivity to exposure errors. In another embodiment the first and second imaging characteristics each comprise one or more characteristics chosen from the set of density, tint, color, reflectivity, absorption, granularity, microstructure, size, shape, distribution, randomness, structure, shape, edge sharpness, and depth. In another embodiment, one of the first and second portions comprises a symbol and the other of the first and second portions comprises a background. In another embodiment, the symbol is chosen to provide information related to the at least one imaging parameter setting range.

In another aspect, the invention features a method for calibrating an imagesetter using an array of sensors. The method includes imaging a sensor by defining an image having a first portion and a second portion proximate to the first portion. The first portion has a first imaging characteristic and the second portion has a second imaging characteristic such that one of the first and second portions is less sensitive to an imaging parameter than the other of the first and second portions. The method further includes imaging said image such that the first portion and the second portion appear substantially similar for at least one desired imaging parameter setting range and appear different otherwise. The method further includes modifying the imaging parameter after the sensor is imaged, repeating the imaging and modifying steps for a range of imaging parameter values, and determining a preferred imaging parameter value based on the similarity of the first and second portions.

In another aspect, the invention features a control wedge. The control wedge includes a plurality of blocks filled with different grayscale halftones, and a visual sensor having a first portion having a first imaging characteristic and a second portion proximate to the first portion having a second imaging characteristic. The imaging characteristic of one of the first and second portions is less sensitive to an imaging parameter than the imaging characteristic of the other of the first and second portions, such that the imaging characteristic of the first portion and the second portion appear substantially similar for at least one imaging parameter setting range and appear different otherwise.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

This application claims priority to U.S. patent application Ser. No. 08/800,937 filed Feb. 13, 1997, which is incorporated herein by reference.

Figure 1:
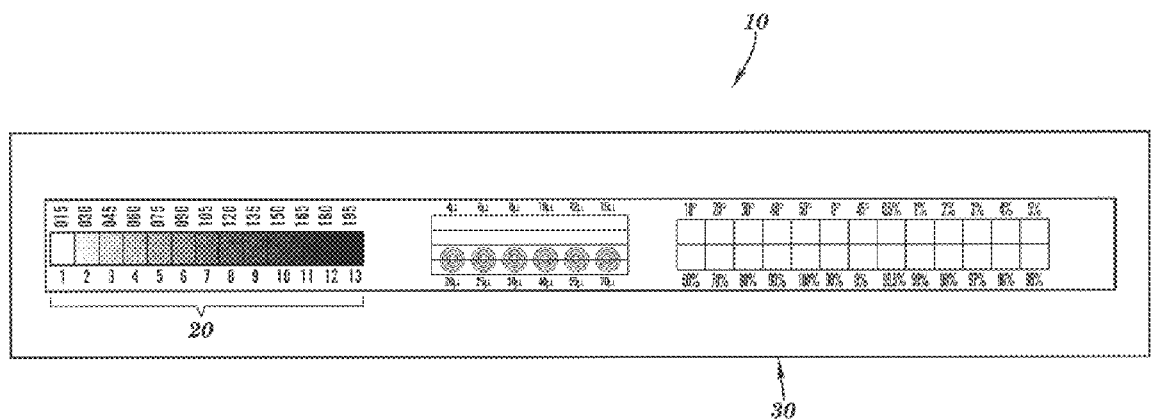
FIG. 1 is a prior art wedge of the type utilized in non-digital platemaking operations.
Figure 2:
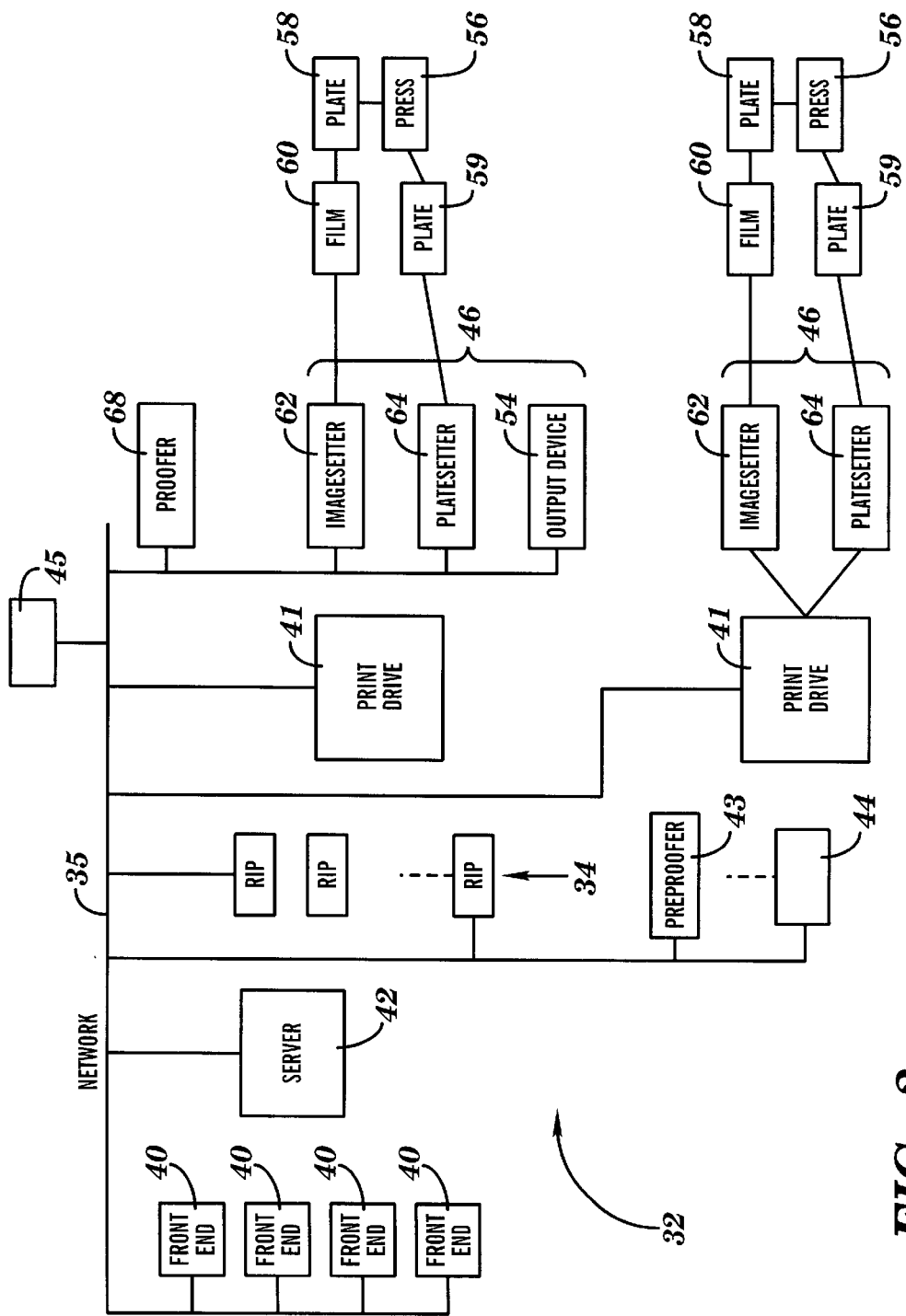
FIG. 2 is a block diagram of an embodiment of a prepress imaging system according to the present invention.

Referring to FIG. 2, a digital prepress system, generally referred to by reference numeral 32, includes one or more computers that are referred to as front ends 40. The front ends 40 are connected to computer network 35. The front ends 40 are used for creating, editing, or otherwise preparing image data for printing. Both color and black and white images are prepared on the front ends 40 for processing by the prepress system and eventual image reproduction by a printing press 56 using a printing plate 58. The front ends 40 can be commercially available computers, for example including, but not limited to computers having operating systems such as Windows NT™, Mac OS™, or a version of UNIX™. The front ends 40 have imaging application software such as that commercially available as Quark Express™ and Adobe Pagemaker™. The front ends 40 may also have imposition software used to lay out pages within an image, such as Impostrip™. Impositioning software positions one or more pages within an image, so that multiple pages are presented in a single image. Having multiple pages imaged on a single plate increases productivity, because multiple pages are printed at the same time. The imaging application software and the imposition software both produce images coded in a page description language. The front ends 40 can output images coded in a page description language directly to raster image processors ("RIPs") 34 via the network 35. The front ends 40 can also output images to an image server 42 via the network 35.

The network 35 can be any of the various types of commercially available computer networks, but must be of sufficient capacity to handle the traffic generated by the prepress system. In one embodiment, the network is a Fast Ethernet network, including a 100baseT Hub and appropriate connections between the networked components and the hub.

In one embodiment, image server 42 receives images output from front ends 40 and stores them on the system. Image server 42 can queue jobs for immediate transmission to one of the RIPs 34 when a RIP 34 becomes available. Image server 42 can also store images from the front ends 40 for later processing by RIPs 34. Image server 42 helps improve workflow efficiency by allowing front end users to output their jobs even if the RIPs 34 are busy. By queuing a job for the RIP 34 on the server 42, the RIP 34 can be kept continuously busy.

The RIPs 34 may be software RIPs operating on a computer system, which may be one of the front ends 40, or on a server class computer system. Such software RIPs include the Agfa Viper™ software RIP and the Agfa Taipan™ software RIP available from Agfa Division of Bayer Corporation in Wilmington, Mass. The RIPs 34 may also be dedicated hardware RIPs, such as the AgfaStar™ hardware RIP, also available from Agfa. Each RIP 34 has a software and/or hardware RIP module for RIP functions such as screening, trapping, imposition, page or image combination, color separating, and/or color management of image data.

The RIPs 34 each include an input network interface module over which text page description language or other types of input image files are received from front ends 40 or the image server 42. Each RIP 34 thus appears on the network and can be accessed by any front end 40 or the image server 42 or other computer system on the network 35. The input network interface module may also serve as an output network interface module so that a single network interface connection connects each RIP 34 to the network 35. In another embodiment, a separate network connection connects each RIP 34 to a print drive 41 to maximize system performance.

A print drive 41 includes a plurality of software modules operating on a standard computer platform configured for efficient print drive functions. The print drive hardware may also include a number of interface boards or modules including a fast network interface and hardware connection to an output device 46 such as an imagesetter 62 or platesetter 64. Print drive 41 receives raster data that is output from RIPs 34, and stores the images for output by output devices 46. Print drive 41 may be connected to the RIPs 34 via the network 35, or may have individual connections to the RIPs. The print drive 41 may be directly connected to the output devices 46, as shown in the embodiment of FIG. 2, or it may connect with the output devices via network 35, or via other connections. The final output devices 46 include imagesetters 62 and platesetters 64. Output devices can also include proofer 68, and printers and plotters 54, and such other output devices used in the industry.

Imagesetter 62 images on photosensitive film or paper. The photosensitive film 60 is used to make at least one plate 58. A plate 58 is used on press 56 to print one color of an image. On a black and white image, only one color, black, is usually necessary. For a color image, generally at least the three "process" colors, cyan, magenta, and yellow, and often a fourth color, black, are used. These colors are sometimes referred to as "CMYK." One or more "spot colors," which refers to an additional color, may be used as well. The imagesetter 62 images the raster data for each color onto film, and the film is used to make a plate 58. The plates are then used on the press to print high quality printed material, often in large quantities. This result of the electronic prepress printing process may be referred to as the final image. Examples of imagesetters are the Selectset Avantra™, the SelectSet 7000™, and the AccuSet Plus™ imagesetters, all available from Agfa Division, Bayer Corporation of Wilmington, Mass.

Platesetter 64 images directly onto a plate 59, without the use of film 60. By use of a platesetter 64, the step of creating a plate 58 by using film 60 is eliminated. This can improve the workflow, because it eliminates a step, and also eliminates the material cost of film 60. Examples of platesetters are the Agfa Galileo™ platesetter and the Agfa Polaris 100™ digital platesetting system, available from Agfa Division, Bayer Corporation of Wilmington, Mass.

Proofer 68 is an output device that outputs images. An example of a proofer is the Agfa DuoProof Ultra™ available from Agfa Division, Bayer Corporation of Wilmington, Mass. Another example of a proofer is the POLAPROOF, also available from Poloroid Corporation, Cambridge, Mass. A proofer can image onto plain paper or other media, and may use techniques including, but not limited to, toner dispersion, thermal wax transfer, and dye sublimation. The proofer may output monochrome images and/or color images. Color images may be imaged using process colors, which are three or four colors that are combined to produce a color image. A proofer may have any line ruling and resolution, although generally the resolution is less than the resolution of the final image. For example, a final image may be imaged by a final output device at 3600 dpi, while the maximum resolution of a proofer may be 600 dpi.

Preproofer 43 converts RIP processed raster data into data that can be displayed by proofer 68. In one embodiment, preproofer 43 is software that runs on a general purpose computer, such as a server class computer running such operating systems as Windows NT™, MacOS™, or a version of UNIX. In another embodiment, preproofer software is included on the same system as a front end 40, a RIP 34, or a print drive 41. If the preproofer is software residing on a front end 40, a RIP 34, or a print drive 41, the system must be of sufficient capacity to handle the added functionality. In another embodiment, preproofer 43 is a dedicated hardware platform.

For the digital prepress system of FIG. 2, it is useful to calibrate the output devices 46, including proofer 68. Calibration includes adjustment or image quality check of various imaging parameters. Imaging parameters are variable that affect the image, and include, but not limited to such variables as exposure setting, pulse width modulation, focus, balance, sidelobe size, sidelobe shape, sidelobe intensity, spot ellipticity, media transfer function and gamma, edge sharpness, dot gain, uniformity, ink receptivity to media, physical media changes, pattern dependent effects, sensitivity to position errors, and sensitivity to exposure errors. To calibrate a writing engine or to verify imaging quality, it is often necessary to measure the output at various imaging parameter settings. This can be a time consuming process. It is useful to have a visual sensor that can indicate to a user or technician an appropriate imaging parameter setting. Such a sensor can be imaged on a media to detect imaging parameters. Such a sensor can also be detected by a machine vision system.

A visual sensor having two or more portions, including a first image portion and a second image portion, is imaged to provide information about, one or more imaging parameters. The sensor is able to detect the state of one or more imaging parameters. The first image portion has a first imaging characteristic, and the second image portion has a second imaging characteristic. Imaging characteristics are characteristics of an image that can include such features as apparent density level, tint, color, reflectivity, absorption, granularity or microstructure, size, shape, distribution, degree of randomness, structure, edge sharpness, and depth or dimension. One of the portions is less sensitive to one or more imaging parameters than another portion, so that at least two image portions appear substantially similar at a desired range of imaging parameters, and appear different otherwise. The imaging characteristic of the a portion is distinguishable from the imaging characteristic of another portion for one or more ranges of one or more imaging parameters, and is not distinguishable for the alternate range(s) of the one or more imaging parameters. A range can be a particular imaging parameter value, or a range that excludes one or more imaging parameter values.

In one embodiment, at least one of the image portions has a shape, and another image portions forms a background surrounding some or all of the shape. One or more shapes can form separate but adjacent regions, or image portions, within a sensor. The shapes can be designed to produce a visually detectable contrast when subjected to certain imaging conditions. Symbol shapes provide additional information in graphic form. For example, an arrow can indicate direction of best focus, a plus sign can indicate that an image is overexposed, and one or more alphanumeric characters can indicate which parameter is being measured.

Figure 3:
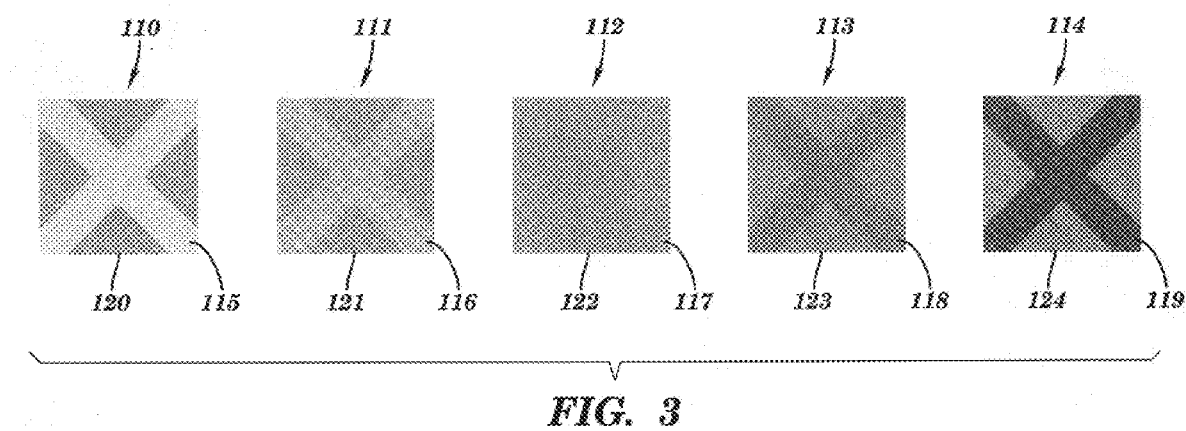
FIG. 3 is an example of an embodiment of a visual sensor according to the present invention showing symbol contrast change with incremental steps of a test parameter.

Referring to FIG. 3, a visual sensor 110–114 is shown as an imaging parameter is decremented from right to left through five imaging parameter settings. The visual sensors 110–114 each include a first portion, the tinted background 120–124, and a second portion, the tinted symbol 115–119. In these sensors, the symbol 115–119 is the letter "X". An imaging characteristic of the symbol 115–119 and the background 120–124 is tint density. The density contrast between the symbol and background tints are manipulated by the imaging parameter. In this example, the symbols 115–199 and the background 120–124 are imaged with different fill patterns. The tint fill patterns are the patterns of dots that compose a tint. Tint fill patterns can be periodic, such as 1×2 vertical lines, or 2×2 checkerboard patterns, or more complex patterns, or alternatively, tint fill patterns can be aperiodic and/or random. The symbols 115–119 fill pattern and the background 120–124 fill patterns have a different imaging characteristic, meaning that they react differently to an imaging parameter. In this example, the background 120–124 consists of a coarse tint which has low sensitivity to the imaging parameter while the symbol 115–119 consists of a fine tint having high sensitivity to the imaging parameter. The high visual contrast of the symbol results from a difference in the imaging characteristic of the two image portions, that is in this example the sensitivities of the two fill patterns to the imaging parameter. The fill patterns are chosen to produce equal density to the eye when the desired parameter condition is met and to produce unequal densities otherwise. As a result, in the example of FIG. 3, the symbol 'X' is visible 115,116,118,119 as the imaging parameter is varied (for a particular range of imaging parameters) and is substantially not visible 117 when the imaging parameter is another range of imaging parameter values. A fine tint background and a coarse tint symbol could also work, but using the coarse tint in the background provides that the background tint will be consistent with the changes to the imaging parameter for each of the sensors.

The symbol is not readily distinguishable from the background when the apparent density of the symbol and the background are substantially similar, and this is what is meant by substantially not visible. Sensors can be designed having other imaging characteristics that are sensitive to other imaging parameters (i.e. other than apparent density), and that will render a shape or symbol substantially invisible at some imaging parameters values and visible at others.

In the example of FIG. 3, the five instances 110–114 of the visual sensor are imaged, each with a different imaging parameter setting. In this example, the imaging parameter that is manipulated is pulse width modulation. When the imaging parameter pulse width modulation is set to its lowest value 110, the fine tint of the symbol X 115 appears much lighter than the background 120. When the pulse width modulation is set to it's next lowest value 111, the fine tint of the symbol X 116 appears darker, but still lighter than the background 121. At the median pulse width modulation setting 112, the fine tint of the symbol X 117 is indistinguishable from the background 122. At a higher imaging parameter setting 113, the symbol X 118 appears darker than background 123. At the highest imaging parameter setting 114 shown in the example of FIG. 3, the symbol X 119 appears much darker than the background 124. In all instances of the sensor 110–114, the background 120–124 is a coarse tint that is substantially insensitive to the imaging parameter, and so the background appears to be substantially the same tint at all imaging parameter levels. The example shows that the sensor reaches a null at middle parameter value. The null is the imaging parameter value at which the symbol is substantially similar to the background. In this example, the symbol has tint that is substantially similar to the background at the middle parameter setting. A sensor might be designed so that the symbol and background are substantially similar for one value, as in this example, or for more than one value, or for a range of values. A sensor can also be designed to operate in the opposite manner, so that the contrast is high at a desired parameter setting at the contrast is low otherwise.

Configuration of a writing engine may require multiple imaging parameters, and an imaging parameter may have multiple competing criteria for its proper set-up. One or more of these criteria may not be directly measurable on the media with traditional tools. Calibration by some subsequent process step may be required. To accomplish set-up or image quality qualification by direct observation of the media itself, an group of visual sensors can be used, one for each variable and possibly several for comparative visual reference. Each visual sensor can be designed to isolate an imaging parameter from the interactive performance of the imaging system. For example, a sensor may be calibrated to visually display performance of a subsequent process step by incorporating the appropriate transfer function as structural change in a fill pattern. Since the transfer function is incorporated into the fill pattern, there is no error due to a unit-to-unit engine variations and therefore no need for custom calibration of each engine.

Figure 4:
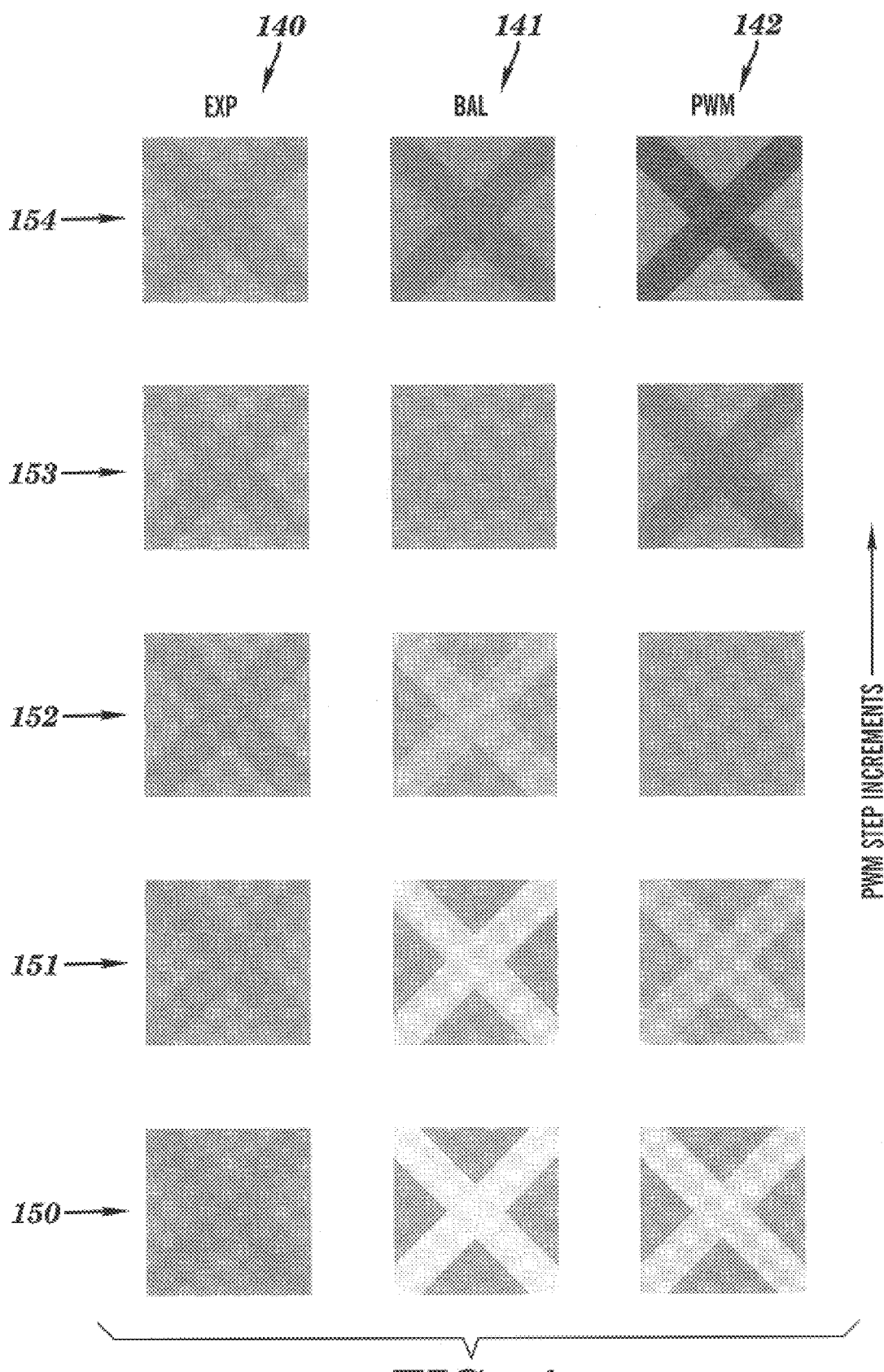
FIG. 4 is an embodiment of a sensor array for monitoring three imaging parameters.

Referring to FIG. 4, a series of sensors is used to calibrate the video modulation duty cycle imaging parameter. The video modulation duty cycle is calibrated by adjusting the pulse width of the beam "on" state in a laser recording system, referred to as pulse width modulation ("PWM"). Pulse width modulation varies the weight of vertical lines by a fraction of a pixel but has no effect on horizontal lines since they are not modulated. The effect on the vertical axis of PWM is often limited to patterns with modulation components of less than 10 to 20 pixels.

One common set-up criteria for a writing engine is to adjust PWM until the dot error for a given reference halftone tint is zero. Dot error is the deviation for the correct geometric weight of a pattern. For example, a pattern that has a 10% dot error appears 10% darker than its geometric weight. A 1-on 1-off fill pattern has a 50% geometry. A 1-on 1-off fill pattern with a 10% dot error will appear to be a 60% tint.

PWM adjustment can be a form of dot gain compensation. A possible complication of adjusting PWM for dot error without also considering other variables is that other significant image quality issues may be masked, for example a defocused spot, low modulation contrast or poor response time. In the calibration and qualification processes, it can be useful to qualify focus, modulation contrast, and/or response time as well as set up PWM.

Still referring to FIG. 4, a visual sensor array 140–142 is imaged at five imaging parameter values 150–154. In this example, the array is stepped at five values for PWM, meaning that for each instance of the sensors the array is imaged at a different imaging parameter (PWM) value. In the first column 140 is the exposure level sensor ("EXP") for determining a correct exposure level visually. The sensor in the second column 141 is a balance sensor that indicates a geometric balance ("BAL") condition. In this example, balance is defined as the point where the dot error magnitude for a 1×2 pixel vertical line pattern is equal but opposite in sense to that for a 2×1 vertical pattern. The sensor in the third column 142 determines the zero dot error point. Each row 150–154 shows the sensor array imaged at a different PWM setting. In the example of FIG. 4, the imaging parameter PWM is incremented in the direction from row 150 to row 154 so row 150 has the lowest PWM setting of the set and row 154 has the highest setting.

In this example, exposure, balance, and zero dot error point are imaging parameters. The imaging characteristic is apparent tint (density). One portion, the symbol, of each sensor has one imaging characteristic, and the other portion, the background, has another imaging characteristic. The different imaging characteristics of the sensor image portions result in observable differences in the portions for various imaging parameters.

Figure 5:
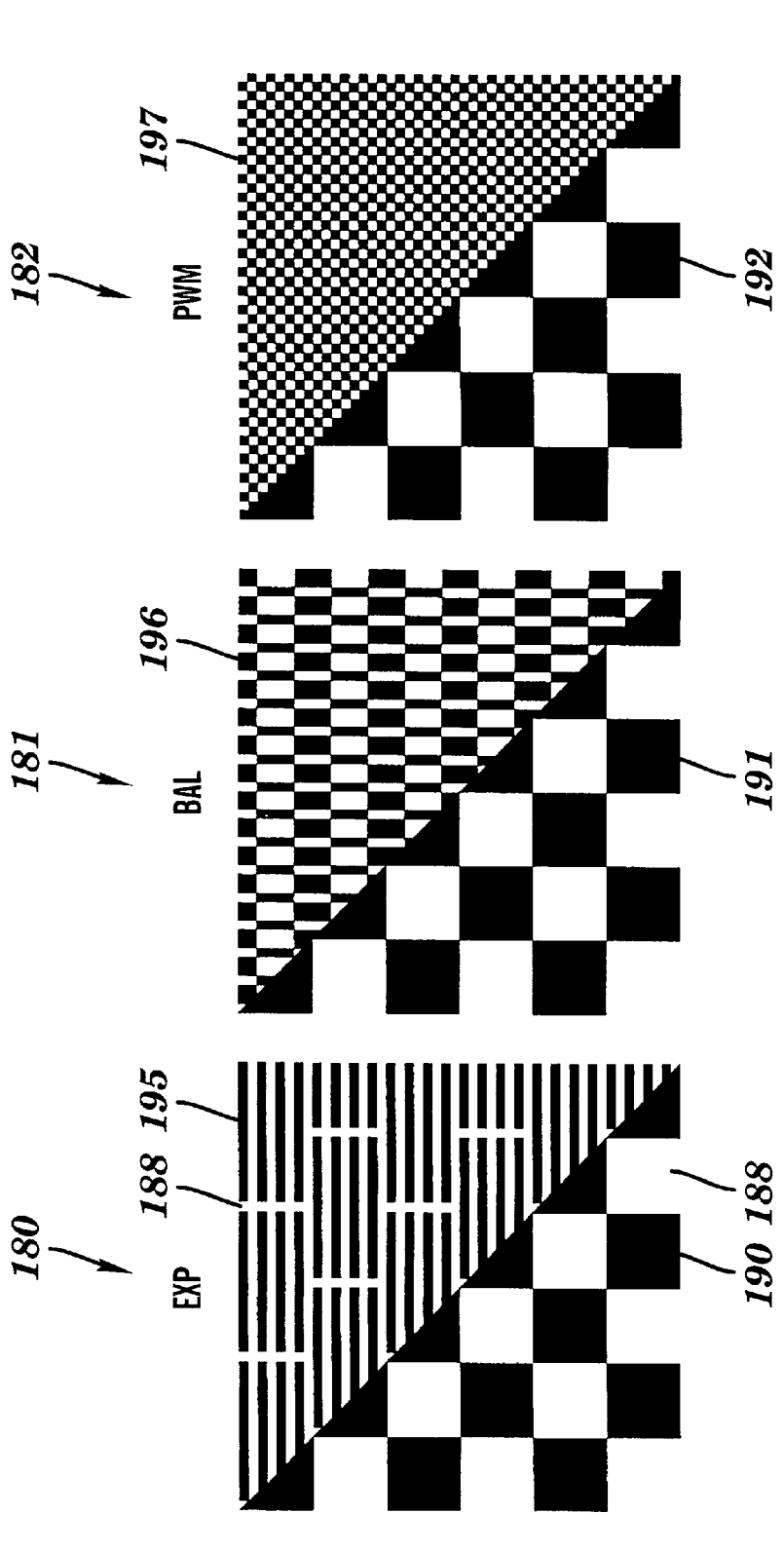
FIG. 5 is a magnified view of the fill patterns used for the sensor array of FIG. 4.

The exposure sensor 140 is used to determine a reference exposure setting. The exposure sensor 140 compares the tint levels produced by two different fill patterns: 1×1 horizontal lines and 8×8 pixel horizontal lines. Referring to FIG. 5, in the enlargement of the exposure sensor 180, both the 1×1 and the 8×8 line patterns contain a gap 188 in the vertical axis repeating at a sixteen pixel pitch. In the coarse background tint 190, the gap is eight pixels which results in a checkerboard pattern. In the fine tint of the symbol 195, the gap is smaller and is only one or two pixels. This gap 188 can be adjusted to tune the density intercept point, which is the imaging parameter value at which the symbol 195 and background 190 appear similar. By properly selecting gap size, the sensor can be set to a desired exposure criteria. Non-integer gap size is achieved by alternating between several integer pixel gap sizes in a repeating pattern. For this exposure sensor, the sensitivity is about 1% contrast change for 2% exposure change. The sensor is independent of PWM changes since that PWM affects the fine and coarse patterns equally. FIG. 4 shows the exposure sensor is at its density intercept point or null since the symbol is not visible. This indicates to the operator that the array has been imaged at the correct exposure setting.

Referring again to FIG. 4, the balance sensors in the second column 141 can be used to detect a geometric balance condition, meaning that the highlights and shadows of a halftone tint have approximately the same absolute value of dot error. For the purposes of the sensor, geometric balance is an imaging parameter defined as the point where the dot error magnitude for a 1×2 pixel vertical line pattern is equal but opposite in sense to that for a 2×1 vertical pattern. Referring to FIG. 5, the fill pattern for the balance symbol 196 therefore contains an equal mixture of 1×2 and 2×1 pixel vertical line patterns. The background 191 is an 8×8 pixel checkerboard pattern. The equal mixture of 1×2 and 2×1 pixel vertical line patterns produces a sensitivity response equal to the midpoint between the sensitivities of the two line tints. The two tint patterns are in balance when the tint of the combined line patterns equals the tint of the low resolution 8×8 checkerboard pattern.

Referring again to FIG. 4, the PWM sensors in the third column 142 determine the zero dot error point. In general, calibration (set-up) of PWM is dependent on exposure. The PWM sensor 142 detects dot error at the exposure and PWM settings. Referring to FIG. 5, the PWM sensor 182 compares 1×1 and 8×8 pixel checkerboard patterns. These two tints will appear to be identical and approximately equal to 50% when the image quality is in tolerance range. Sensitivity of this PWM sensor is about 1% contrast change for 0.2% change of dot error of 8×8 checkerboard.

A sensor array can be imaged at calibrated increments of PWM value. In a properly functioning writing engine, the null points for a PWM sensor array 142 and a BAL sensor array 141 will occur at the same PWM value. If the image quality is compromised by other factors, for example if there are errors present that are masked by PWM compensation, the null points for the two sensor arrays 141, 142 will differ. The direction and magnitude of this difference is a measure of quality. So also is the magnitude of PWM compensation required for zero dot error. In practice, to qualify or calibrate a system, tolerances are placed on the amount of PWM compensation allowed, the deviation between the null points of tiles, and the exposure setting. As shown in FIG. 4, the PWM sensor array is null in the middle row 152, but the BAL sensor array is null in the second sensor from the top 153. This might imply that the image quality is in fact compromised by other factors, depending on the acceptable tolerances and the relevant imaging parameter settings and step increment.

For example, an imaging system can be calibrated or qualified using the sensor array of FIG. 4. If exposure is acceptable, the sensor indicates whether the amount of PWM adjustment required to produce zero dot error is within a tolerance range. In addition, the sensor can indicate whether the balance condition, as a function of PWM, occurs at a PWM setting close to that for the zero dot error point. The exposure sensor 140 of FIG. 4 indicates that the exposure is within range since the symbol is barely visible. The PWM sensor 142 is null at the median value 152. The BAL sensor 141 is null 153 at a PWM value that is close to the value in which PWM is null. For a small PWM step between sensors, the proximity of the PWM null and the BAL null would probably be acceptable.

If there is a significant tolerance zone that is acceptable for an imaging parameter that may result in some ambiguity in the visual interpretation of a sensor, it is possible to image a reference next to the sensor to demonstrate pass/fail limits. The reference is designed with an imaging characteristic of insensitivity to the imaging parameter, for example a coarse tint in the previous example. The reference thus provides a stable fixed visual effect as the imaging parameter is varied. A tolerance can also be built into the sensor by adding a calibrated bias in the design of the fill patterns.

Varying a imaging parameter while imaging an array of sensors, such as the array of FIG. 4 in which PWM is incremented for each row 150–154, aids the visual decision by providing a range of sensor response from which to make a visual comparison. However, many applications do not allow parameter stepping, such as an isolated sensor that monitors a fixed engine state.

Figure 6:
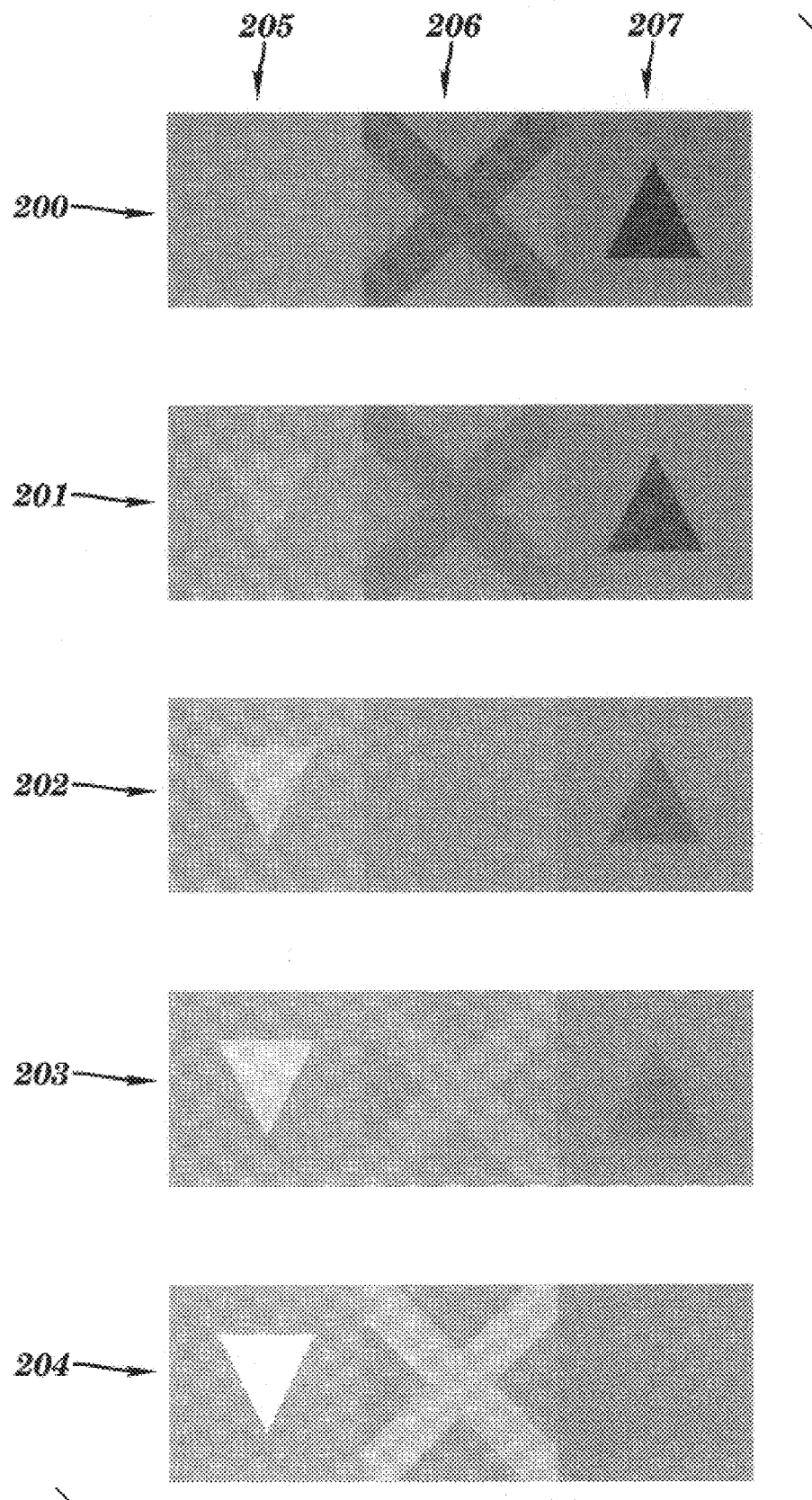
FIG. 6 is an embodiment of sensors with increased sensitivity to an imaging parameter.

Referring to FIG. 6, it is possible to increase the resolution of a sensor without requiring parameter steps. In one embodiment, three sensors 205, 206, 207 with identical sensitivities are placed side-by-side. Arrow symbols are chosen for the left 205 and right 207 sensors to indicate when the test variable is under ($\nabla$) or over ($\Delta$) its tolerance limits, respectively, while the central sensor uses the symbol "x". The response sensitivity curves for the outside tiles are then offset in opposite directions from the central tile by applying tint offsets to their respective fill patterns. The offsets cause the down arrows 205 to be lighter than the "x" 206 and the up arrow 207 to be darker. The combined result is a set with increased visual sensitivity to the imaging parameter. At the intended parameter null point 202 the "x" disappears and the arrows are at roughly equal but opposite contrast with respect to their background. If the imaging parameter is increased slightly to the point where the "x" becomes threshold visible 201, the up arrow will become highly visible while the down arrow starts to disappear. In addition, both the "x" and the up arrow are darker than the background. This clearly indicates to the user that the parameter has exceeded tolerance. If the visual decision were left to the central tile alone, it would still be ambiguous because the "x" is only visible at a threshold level. A similar effect occurs for the down arrow if we go below tolerance except the down arrow and "x" are lighter than the background.

This technique for increasing sensitivity has been described with reference to three sensors, but it should be clear that it can be extended to any number of sensors. In fact, the six image portions of the three sensors could be combined into a single sensor. Such a single sensor having six image portions would have the same sensitivity characteristics described above with regard to three sensors.

The sensitivities of each fill pattern can be "tuned" by selecting mixtures of fine patterns each having a unique sensitivity to one or more engine variables. The eye sees only the combined sensitivity of the mixture if it is of sufficiently high spatial frequency. Many sensors that use contrast as an indicator seem to require at least a 2% tint difference to make a reliable decision on sensor visual state. In other words, users could correctly choose between a tile with <1% symbol contrast and an adjacent one with >2% symbol contrast. This is for high resolution film viewed on a light table. The detection threshold may be different for reflective media, although initial tests on aluminium plate material show similar results.

Creating a sensor to indicate a range of engine parameter settings for one or more engine parameters can be accomplished in various ways. A model of the imaging system can be used to approximate the response of the imaging process to changes in imaging parameters. This is accomplished by modelling the writing engine and the media, which includes for example in an imaging system based on a laser, such variables as the spot of light, the shape, intensity, and aberrations of the spot, the addressing increment, other descriptors such as amplitude, lobes, side-ringing, and so on, modulation and modulation aberrations, the address space (size), and the engine scan mode (how lines are summed). The model can take into account the imaging parameters, such as focus, spot size, spot side lobe size, addressability, pulse width modulation, and so on. The model can also include a function that describes the media, for example its exposure sensitivity, how it will react to under/over/ appropriate exposure, and so on. Such a model can be derived theoretically by studying the properties of the engine and the media, or a model can be derived experimentally by measuring the output of the imaging system using a particular media. The more variables that are included in the model, the better the model, and the better the results.

The model can be used to design patterns that are more sensitive to some imaging parameters, and less sensitive to other imaging parameters. For example, referring again to FIG. 5, the exposure sensor 180 is relatively immune to changes in pulse width modulation. If the horizontal axis of both the symbol 195 and the background 190 are stretched or reduced, as would happen with changes in pulse width modulation, the contrast between the symbol 195 and the background 190 would not change. For example, in another variation of the exposure sensor design, a one pixel wide notch is placed in the middle of each large "on" block segment of the background checkerboard pattern. The purpose of this is to further reduce sensitivity to PWM changes for lower gamma media, meaning media with a tendency to fog. The notch is designed to be equally as sensitive to PWM induced fog effects as the gaps in the symbol pattern. The width of the checkerboard block segment is increased slightly to maintain a 50% geometric pattern weight.

For example, for the balance sensor 181 of FIG. 5, it is desired that such a balance sensor 181 will be null, that is no difference between the symbol and the background, that is when the dot error of the 1×2 vertical lines and the 2×1 vertical lines is the same. The sensitivity to dot error of the 1×2 and the 2×1 vertical patterns to changes in pulse width can be predicted. Based on those predictions, it is possible to determine the null point at which a particular background will appear similar to a symbol.

Figure 7:
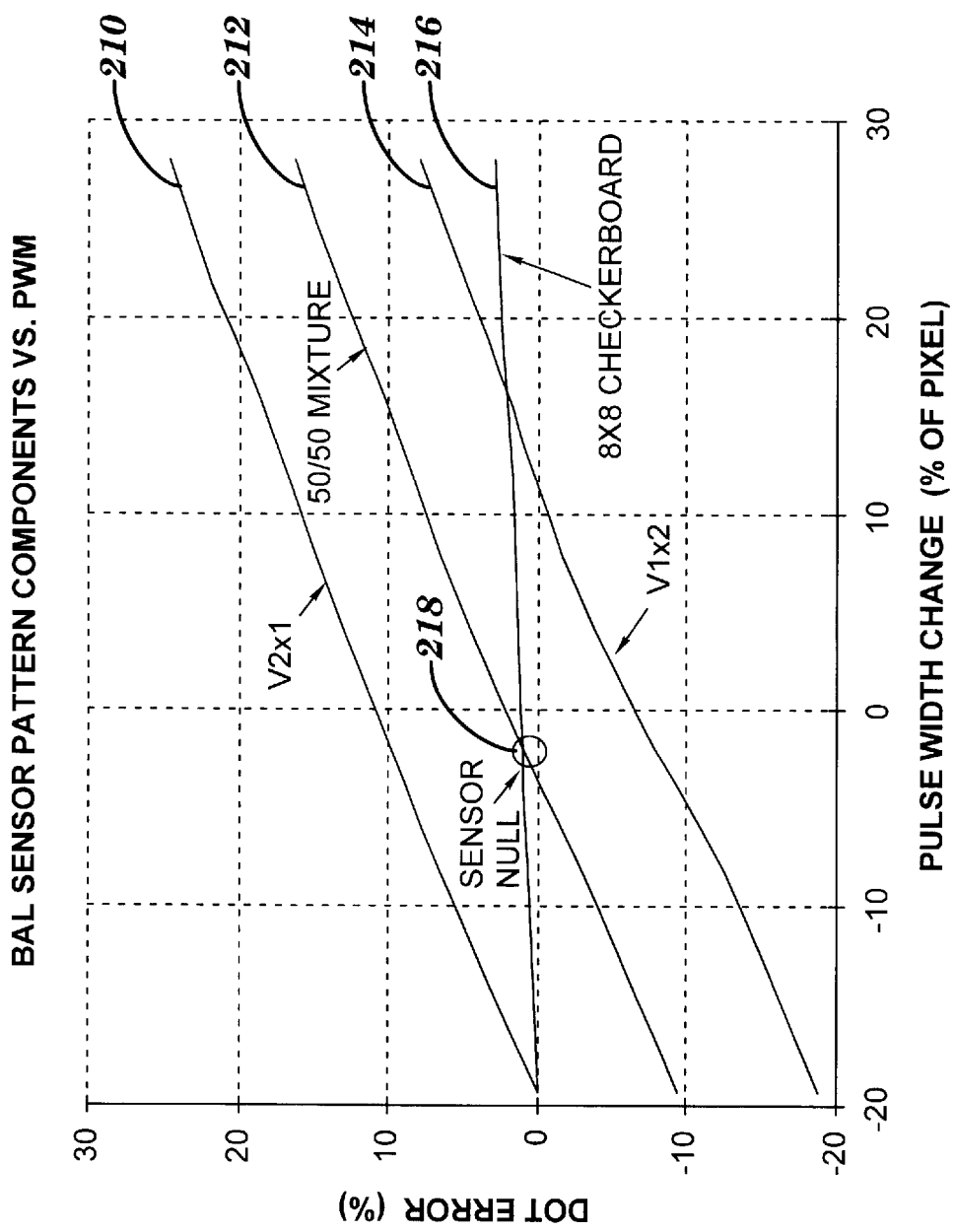
FIG. 7 is a graph showing the dot error of the balance sensor of FIGS. 3 and 4.

Referring to FIG. 7, a measured model of the imaging system describes the dot error sensitivity of several fill patterns. The data for this model was obtained by experimentally measuring the imaging system, that is by measuring the dot error after modification of the pulse width. As described above, dot error is deviation from the geometric weight. When the dot error of two patterns of the same geometric weight are identical, the apparent density of those patterns will appear substantially similar. One curve 210 shows the dot error sensitivity of 2×1 vertical lines to pulse width change, and another curve 214 shows the dot error sensitivity of 1×2 vertical lines. The sensitivity of a 50%/50% mixture of 2×1 vertical lines and 1×2 vertical lines is shown as the average 212 of the 2×1 and 1×2 curves. The relative insensitivity of the dot error of an 8×8 checkerboard to pulse width change is shown by the 8×8 checkerboard curve 216. The combination of the 1×2 and 2×1 fill patterns results in a pattern that appears substantially similar to the 8×8 checkerboard when the pulse width is approximately equal to the size of a pixel address for a high resolution recording system. This is the definition of the zero percent pulse width change point in the horizontal axis. A −10% pulse width change, for example, represents a pulse width that is ten percent smaller than the pixel address size. The null point is shown in the figure as the sensor null area 218, which marks the intersection of the curve for the combined fill pattern 212 and the 8×8 checkerboard 216. With additional manipulation of the mixture, a pattern could be designed with a curve that will intersect the 8×8 checkerboard curve 216 at another point.

Figure 8:
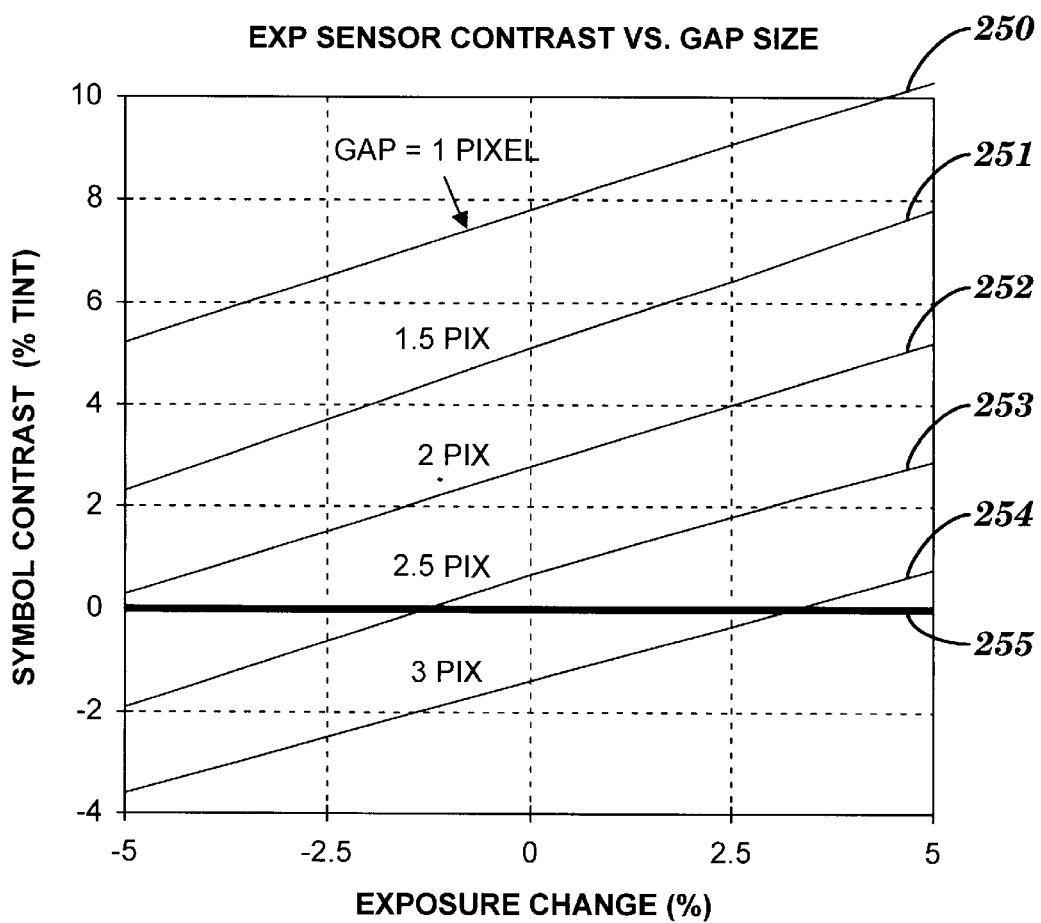
FIG. 8 is graph showing the relationship of sensor contrast to gap size for the EXP sensor of FIGS. 3 and 4.

Referring to FIG. 8, a theoretical model of the system describes change in symbol contrast that results from exposure change. Symbol contrast is the difference between two patterns; the graph shows the change in contrast between the symbol and the background for the exposure sensor 180 described with regard to FIG. 5. In the graph, various pixels of gap are modelled. The first curve 250 represents a symbol with a 1 pixel gap. The third curve 252 represents a symbol with a 2 pixel gap. The second curve 251 represents a symbol with a 1.5 pixel gap, which can be created by a mixture of 2-pixel-gap and 1-pixel-gap fill patterns. Similarly, the 2.5 pixel gap curve 253 represents a fill pattern that is a mixture of other patterns, for example a 3-pixel gap pattern 254 and a 2 pixel gap pattern 252. The reference 255 is a theoretical contrast change of 0. An exposure symbol fill pattern with a 2.5 pixel gap will have zero symbol contrast with the background at an exposure setting that is approximately −1.25% less than the reference exposure defined in the figure, the point at which the 2.5 pixel gap curve 253 intersects the zero contrast line 255. Similarly, an exposure symbol fill pattern with a 3 pixel gap will have zero symbol contrast, the sensor will be null, at approximately 2.8% greater than the reference exposure defined as zero in the figure. Just as in the sensor of FIG. 7, adjustment of the fill pattern mixture will result in a sensor null at a different imaging parameter (exposure change) setting. The exposure sensor just described provides the unique advantage of maintaining a fixed high sensitivity to exposure change while at the same time being tuneable by design so that the sensor null can occur at an arbitrarily selected exposure setting.

Figure 9:
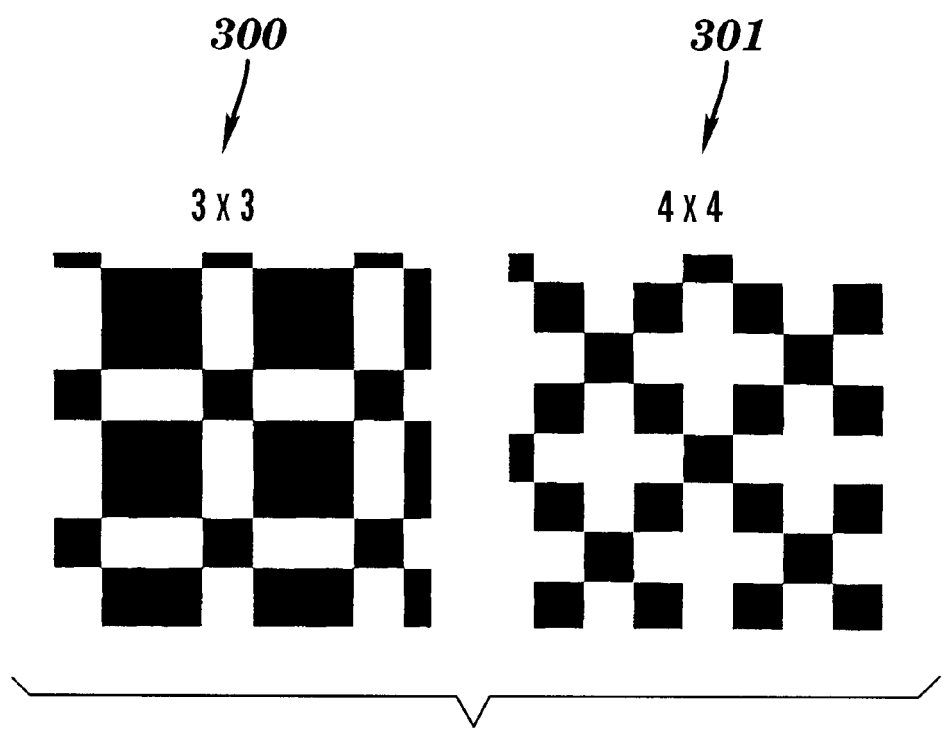
FIG. 9 is a magnified view of a image portion sensitive to focus.

Referring to FIG. 9, a visual sensor according to the present invention also can be designed experimentally. Such a pattern as is shown in FIG. 9 is useful for detecting changes in image density that are caused by improper spot focus. In one embodiment, a fine (i.e. small number of pixel width) pattern of cross-hatched (45 degree) lines appears most sensitive to changes in focus, so that a small change in focus results in a change in pattern density. In this example, the imaging system has lower resolution that must be taken into account. A pattern is used that is as sensitive to focus as possible, but that is also a low enough resolution so as to be resolvable by the media and the entire imaging system. In other words, the sensitivity of the sensor and the resolution of the system are balanced. The frequency of cross-hatched (45 degree) lines are adjusted to maximize sensitivity, but not create imaging artifacts resulting from the inability of the system to fully resolve the image. A 2×2 cell, that is opposing diagonal lines in a 1-on 1-off checkerboard pattern was found to be unsatisfactory. A 3×3 cell 300 with opposing diagonal lines and a frequency of 1-on, 2-off was also not resolvable by the system, as are many odd-numbered cells. The next larger cell 301, having a cell size of 4×4 with opposing diagonal lines and a frequency of 1-on, 3-off, is a good compromise and has sufficient density without optical gain. Thus, the 4×4 cell 301 can be contrasted with a coarse tint of a similar density to produce a focus sensor in which the symbol comprises the fine pattern 301, and the background comprises a coarse pattern.

Variations, modifications, and other implementations of the visual sensors described herein will occur to those of ordinary skill in the art without departing from the spirit and the scope of the invention as claimed. For example, instead of apparent changes in tint, the color, granularity and/or structure of one image portion can differ from that of another image portion for an appropriate imaging parameter range.

A sensor array can be designed that will accurately display the state of the set-up criteria (imaging parameters) over a wide range of engine variables (other imaging parameters), without interference, since the impact of such problems on the set-up decision can be integrated into the performance of the sensors.

Figure 10:
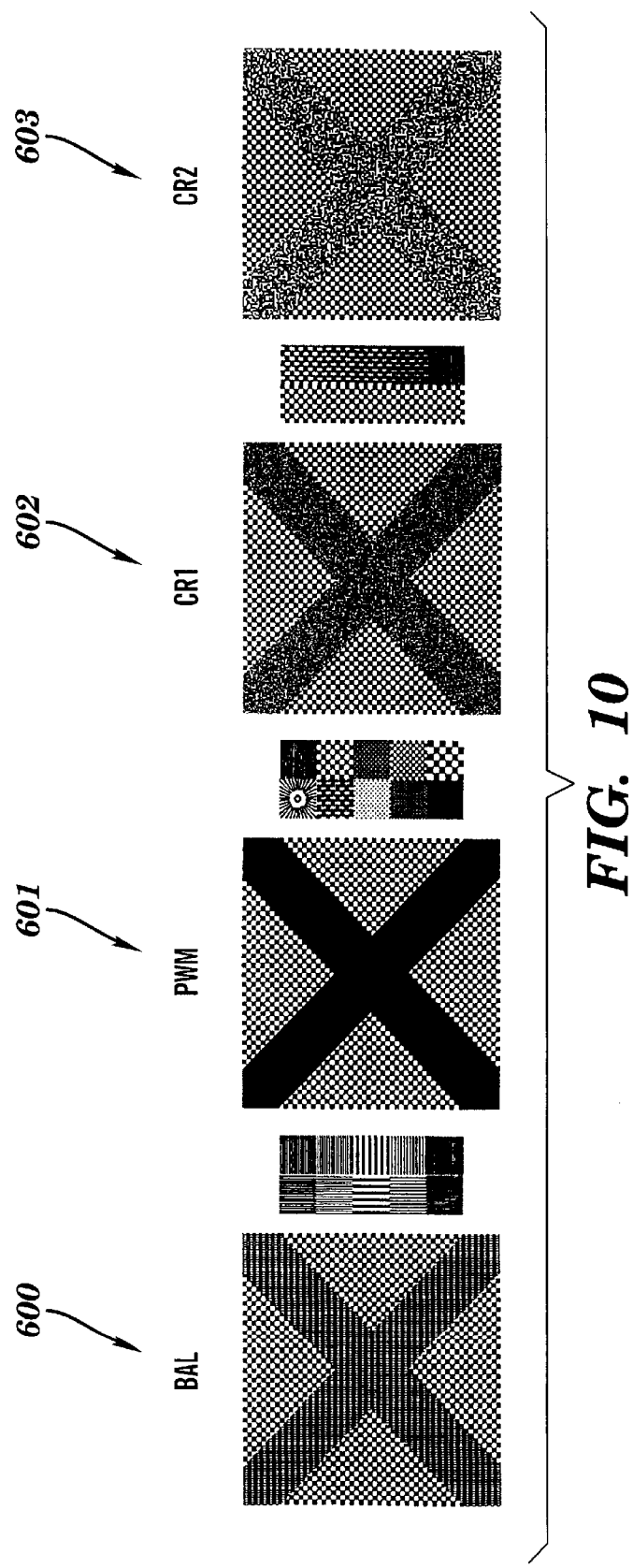
FIG. 10 is an embodiment of sensors according to the present invention.

A sensor can also include randomized patterns. Referring to FIG. 10, four sensors are used to verify that an output device meets image quality specifications. The sensors of FIG. 10 are a variation of the sensors of FIGS. 4 and 5 that assumes an accurate exposure setting. The PWM sensor 601 and the balance sensor 600 perform the same role as described with regard to the PWM and balance sensors of FIGS. 4 and 5 above. The two additional sensors 602, 603 have a 50% pattern weight arranged in a randomized pattern. These patterns were obtained using a randomized screening technique, such as CRISTALRASTER screening available from the Agfa Division of Bayer Corporation, Wilmington, Mass. A quality test of an output device is that the null of these sensors 602, 603, the imaging parameter (PWM) setting at which the symbol matches the background, be within a predetermined tolerance of the null of the PWM sensor 601. If this is the case, then the output device is qualified.

The sensor array shown in FIG. 10 also contains microtiles that provide key diagnostic information when analyzed with a microscope or machine vision system. These are not meant to provide visual effects directly. This added benefit of calibration functionality comes without significantly increasing the size of the array. For example, the microtile set located between the CR1 and CR2 sensors provides the calibration data to produce the set of curves shown in FIG. 7 when the sensor array is stepped over a range of exposure.

Figure 11:
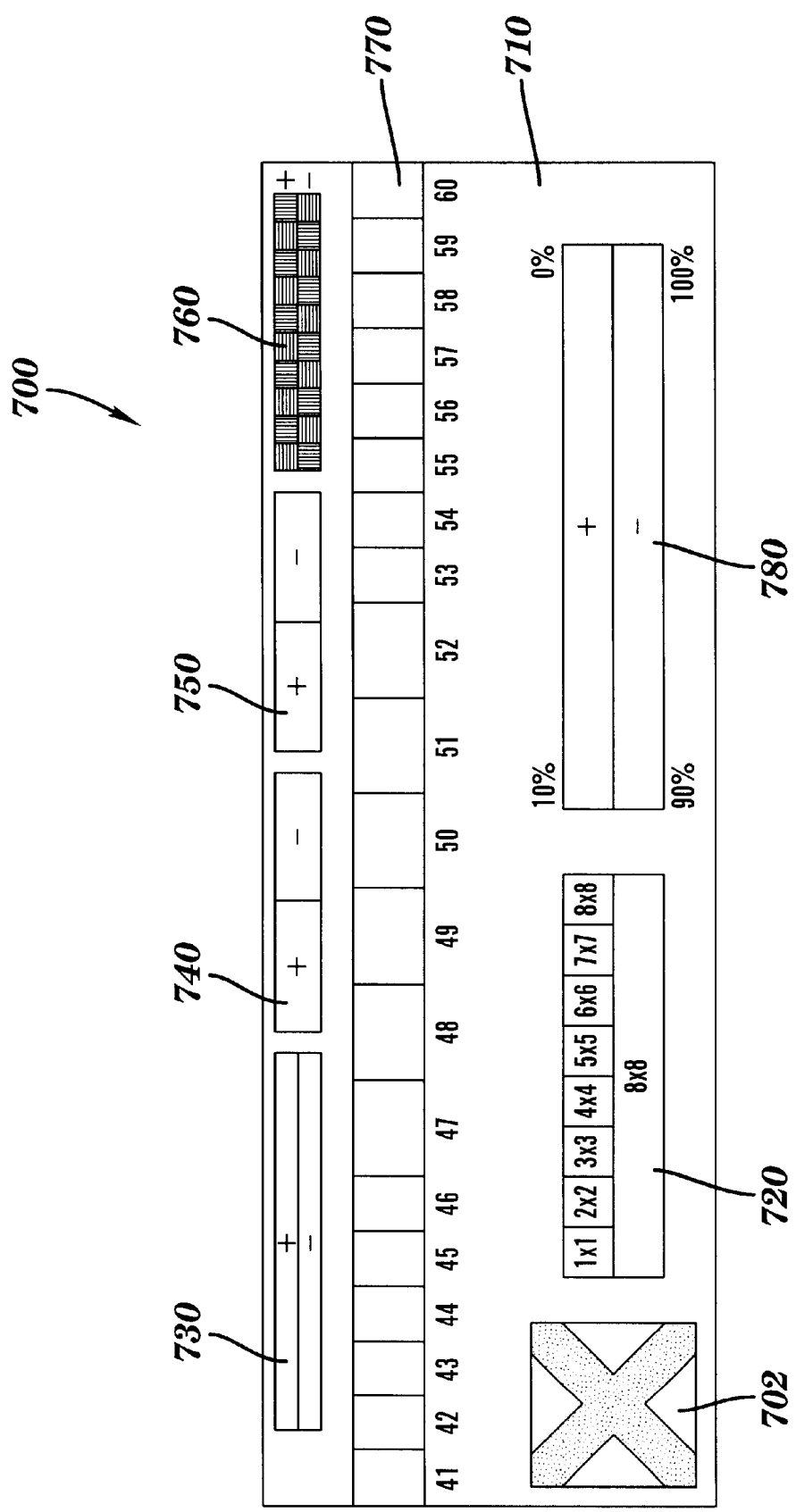
FIG. 11 is an embodiment of a control wedge including a visual sensor according to the present invention.

Referring to FIG. 11, a control wedge 700 in accordance with the present invention includes at least one visual sensor 702 as described above. The digital control wedge typically resides in digital form in a RIP 34 or output device 46 of FIG. 2. In the output devices 46 depicted in FIG. 2, the density and hence the quality of the finished image on the media is affected by the operating parameters of the output device 46.

The combined effects of the imaging and processing devices, that is the imaging system, can be determined using the control wedge 700. Since these affects cannot be readily separated, the control wedge, as will be described below, provides an accurate and user friendly means to establish operating parameters based upon the full system operation, and hence facilitates the establishment and adjustment of operating parameters of the imaging device based upon the operation of the imaging and processing devices.

In the control wedge 700, that actual patterns in the identified areas are described textually using labels rather than by a depiction of the patterns themselves for clarity. The control wedge 700 is formed of various patterns which are imaged on a selected media. It will be understood by those skilled in the art that any combination of the disclosed patterns may be utilized. For example, in certain implementations, it may be desirable or even advantageous to limit the control wedge to, for example, a checkerboard, or a highlight/shadow dot or a midtone array pattern, or to one or more of the text, hairline or microline patterns. However, preferably, all of the patterns depicted in FIG. 11 are included in the control wedge for use in establishing and monitoring the quality images recorded on the media by the output devices 46.

The depicted control wedge 700 is recorded on media 710 and includes an array of checkerboard patches which form the checkerboard pattern 720. The size of the halftone dots forming the checkerboard patches continuously increases on a patch by patch basis from a single pixel to 8×8 pixels, as indicated.

The 8×8 pixel checkerboard patch also extends adjacent to the entire row of checkerboard patches. The 1×1 checkerboard patch is the most sensitive of the imaged patches, with each consecutive patch being less sensitive than the prior adjacent patch. The 8×8 pixel patch represents the least sensitive of the imaged checkerboard patches. The least sensitive dot could, if desired, be either larger or smaller than the 8×8 pixel dot size indicated as will be discussed further below.

The least sensitive patch corresponds to a multiple of the resolution rate of the output device 46. The actual spacing of the pixels, and the coarse adjustment of their size, is determined by the addressability of the platesetter or imagesetter. Minor adjustments to the pixel size, and hence, the size of each halftone dot, is performed by adjusting the exposure, intensity and/or degree of processing. The control wedge 700 is advantageously used for this purpose and particularly for exposure adjustment.

The checkerboard patches forming the checkerboard pattern 720 could, of course, include halftone dots formed of more than sixty-four pixels (8×8). For example, 9×9, 10×10, etc., checkerboard patches could be included, if desired. Similarly, the checkerboard patches could be limited to dot sizes which are less than 8×8 pixels. For example, the checkerboard pattern 720 could, if desired, be limited to checkerboard patches of one pixel through 6×6 pixels. Of course, as will be recognized by those skilled in the art, other dot size ranges could also be utilized. However, preferably the smallest dot size will be a one pixel dot since this will provide the greatest sensitivity to changes in the exposure.

The patch having the largest dot size, in this case the 8×8 checkerboard patch, will beneficially extend adjacent to all other checkerboard patches. For example, if the least sensitive patch in the checkerboard pattern 720 has a dot size of 6×6 pixels, it will be that patch which extends beneath the row of checkerboard patches in a manner similar to the 8×8 pixel patch depicted in FIG. 11.

The one pixel patch has the greatest sensitivity. For typical resolutions, this is always the case because the dot is formed of only a single pixel which grows or shrinks in all directions. The 2×2 halftone dot patch is only half as sensitive as the 1×1 halftone dot patch because adjacent edges of the four pixels forming the dots of the 2×2 patch will not have an affect on the dot's overall size. Hence, as the exposure changes any expansion of adjacent sides of respective pixels forming the halftone dots of the 2×2 patch will not increase or reduce the size of the halftone dot itself, but will only increase or decrease the overlap of adjacent pixels forming the dot, or increase or decrease the empty area between the adjacent pixels. Accordingly, the 2×2 halftone dot patch is less sensitive to changes in the platesetter or imagesetter exposure setting.

The sensitivity continues to decrease with each increase in the number of pixels forming the halftone dots making up the patch in relative proportion to the inverse of the size increase. Hence, each of the patches forming the checkerboard pattern 720 possesses a different sensitivity to changes in exposure which is directly dependent upon and related to the number of pixels in the halftone dots forming the patch. In more practical terms, what this means is that to obtain a change in the tint of the 8×8 halftone dot patch which is perceivable to the unaided eye, a relatively large change in the exposure setting of the platesetter or imagesetter is required. On the other hand, a relatively small change in the exposure setting of the platesetter or imagesetter will result in a change in tint of the patch formed of a 1×1 halftone dot which is perceivable with the unaided eye.

One common reference is that at which the tint of the halftone dot patches forming the checkerboard pattern 720 appear equal to the unaided eye. (This is the reference exposure described as zero with regard to FIG. 8.) When this criteria is met, the dot area of each of the halftone dot patches forming the checkerboard pattern will have a nominal fractional area coverage of 50% or, stated another way, a nominal dot area of 50%. the equal visual tint is reflective of all the halftone dots forming the checkerboard pattern 720 being true checkerboards and hence, being true 50% dots.

The sharpness and resolving power of the medium 710 may, however, affect the sensitivity relationship between different size dots. For example, if the medium 710 is of poor resolution quality or has characteristics which result in the relationship between images of different size dots being nonlinear, the proper exposure may occur at other than a nominal 50% density. This can, for example, be confirmed by using a densitometer to actually measure the density of one or more of the halftone patches of the checkerboard pattern 720 at the selected exposure. This value can then be stored in, for example, the output device 46, RIP 34, for continuous exposure monitoring and calibration, i.e., adjustment during subsequent production recording of images.

To initially establish the proper exposure, an array of the checkerboard patterns 720 at different exposures can be generated on a test medium by the output device 46 and processed in a media processor. The control wedge 700 depicted in FIG. 11 also provides other patterns which demonstrate in even more practical operational terms, the quality of the production images which can be expected at a selected exposure and hence the usability and quality of the images recorded on the medium.

Referring again to FIG. 11, a positively and negatively imaged microline cornfield pattern 760 provides yet another check on the quality of production images which can be expected during production recording at a selected exposure setting. It should be noted that the microlines forming the microline pattern 760 are formed such that the spacing between the lines is twice the width of the lines. Accordingly, if the lines have a one pixel width, the spacing between lines is two pixels. This provides an observer with an enhanced visual perception of the quality of the microlines forming the pattern 760 over that provided by microlines having their spacing equal to their width. The microline pattern 760 is formed of various cornfields having different width microlines, the narrowest of which are 10.6 microns, i.e., one pixel in width, and the widest of which are 63.5 microns, i.e., 6 pixels in width. Of course, other microline widths could, if desired, be utilized. Because the microlines have widths between 10 and 70 millionths of a meter, the microline pattern 760 will react to changes in the resolution setting of the output device. For example, if the smallest mark which can be imaged is 10.6 microns at 2400 dpi, 14.1 microns at 1800 dpi and 21.1 microns at 1200 dpi, these lines are arranged in alternating horizontal and vertical rows to form the cornfield pattern 760. The lines increase in width from left to right as indicated. When the optimal exposure is achieved, the upper and lower segments of each microline patch will have the same visual tonal appearance. Additionally, the microlines will be crisp and clean.

The exposure at which this condition is met produces the same balance condition as described with regard to the balance sensor of FIG. 4. In this example, balance is determined as a function of the imaging parameter exposure, not as a function of the imaging parameter PWM as it was described with regard to FIG. 4. The balance sensor of FIG. 4 could have been stepped by exposure instead of PWM.

The control wedge includes a serif text pattern 730 which is imaged both positively and negatively in decreasing size. Serif text, is the most difficult text to image due to the short lines stemming from and angled to the upper and lower ends of the strokes of the letters forming the text. Over or under exposure of the serif text pattern 730 will result in the serif text fattening and/or the loss of the smaller point sizes which stem from the upper and lower end of the strokes of the letters forming the text, depending on whether the positive or negative serif text images of the pattern 730 are being observed. If the quality of the serif text pattern 730 is good, the text should appear crisp and clean. Hence, by inspecting the positive and negative serif text images, an operator can easily conform that the quality of different sizes of serif text at a selected exposure level are of satisfactory quality.

Positively and negatively imaged hairline pattern 740 is also provided as indicated. The hairlines forming the hairline pattern 740, as will be understood by the skilled artisan, conform to a standard 0.025 mils in thickness. These thin lines provide the operator with a clear indication of the line quality which can be expected for production images recorded on the media 710 at a selected exposure setting. More particularly, when the media is properly exposed, the line weights of the hairlines forming the hairline pattern 740 should be equal and the hairlines should be recorded as a crisp and clean image rendition.

The control wedge 700 also provides a positively and negatively imaged standard serif text pattern 750 which provides a further check and confirmation on the quality of production text imaging which can be expected at a selected exposure level. The standard serif text pattern 750 is formed by recording three point text. Reversed text can be problematic when the exposure is incorrectly set. Accordingly, the standard serif text pattern 750 provides a tool for confirming that the positive and negative three point serif text will be similar in appearance and size in a production run at a selected exposure setting. Here again, a crisp and clean image rendition is indicative of high quality imaging.

A still further check which will provide the operator with balance information in terms of the perceivable density is provided through a midtone array pattern 770 of FIGS. 7 and 8. The midtone array pattern 770 is formed of individual patches between a nominal 41% tint and a nominal 60% tint. Hence, the midtone array pattern 770 will indicate any differences which exist between the specified and measured midtone dot area densities at a selected exposure. Linearity calibration can be utilized to correct for any discrepancies that exist to bring the specified and measured 50% dot patch into alignment. In this regard, the midtone array pattern 770 can be utilized to confirm that the 50% density patch of the midtone array has an actual density of 50%, by reading the density of the nominal 50% midtone patch using, for example, a densitometer.

The exposure setting of the control wedge can be further qualified by measuring $D_{min}$ and $D_{max}$ at the appropriate points on the control wedge 700 using a densitometer. If the exposure does not provide the desired $D_{min}$ or $D_{max}$ value, then another control wedge 700 exposed at a different exposure setting may be selected for the desired $D_{min}$ or $D_{max}$ values.

In one embodiment, the control wedge also includes one or more visual sensors 702 as described above. The visual sensors can detect such imaging parameters as are useful to calibrate or verify the quality of the output device 46.

Figure 12:
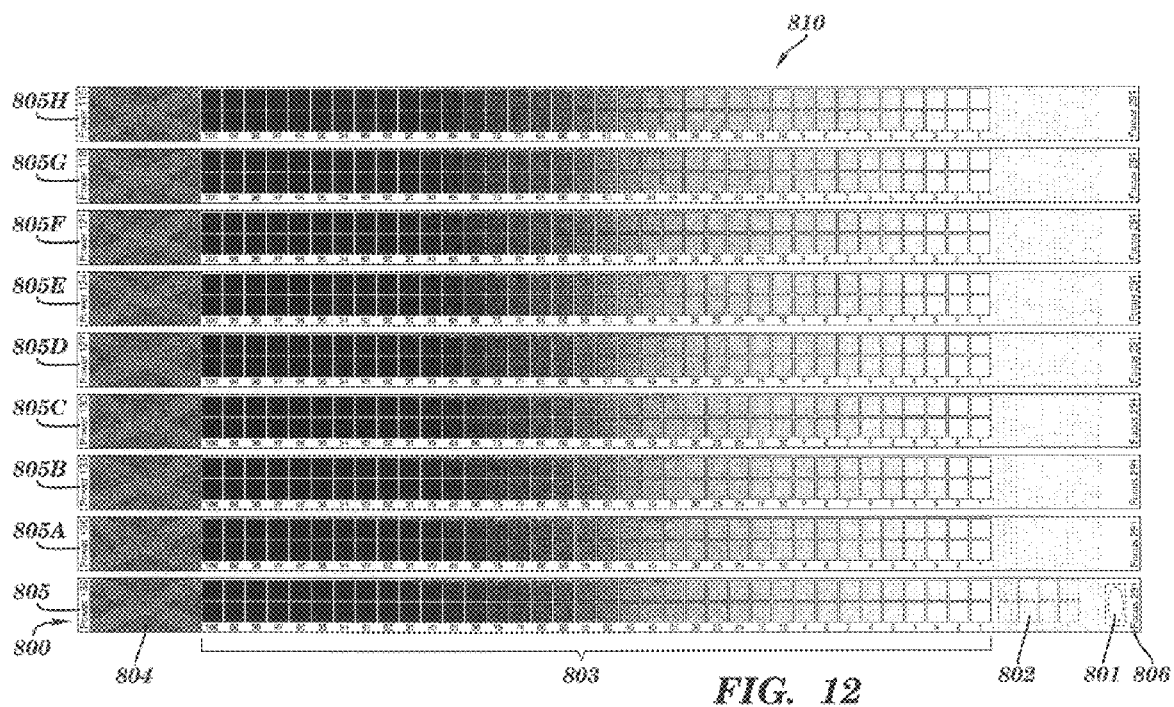
FIG. 12 is an embodiment of a control wedge including a visual sensor according to the present invention.

Referring to FIG. 12, a control wedge 800 is shown that is particularly useful for calibrating a proofer such as the POLAPROOF available from Poloroid Corporation of Cambridge, Mass. The control wedge 800 includes an exposure visual sensor 804. In one embodiment, the exposure sensor 804 is similar to the exposure sensor 180 of FIG. 5.

In another embodiment, the symbol contains 1×1 vertical lines, and the background contains 2×2 vertical lines. The sensor is null when a proper exposure setting is reached. The exposure setting 805 is identified next to the visual sensor 804. In one embodiment, the exposure sensor is imaged during a exposure sweep, but not during a focus sweep, described below.

The control wedge 800 also includes halftone grayscale dot areas 803. The grayscale is shown in two places. The upper row contains halftone levels as calculated by a RIP using a compensation curve, and the lower row contains halftone levels without such calibration. This is useful to determine whether the proofer outputs linear grayscales whether or not the RIP applies correct calibration curves.

The POLAPROOF is a multi-beam system. In a multi-beam system it is important that the multiple beams have similar exposure settings. In the Polaproof control wedge, for example, to image each block, the proofer uses a different imaging spot. Differences between the blocks indicate that the eight beams in the proofer have different intensities. The control wedge 800 also includes eight blocks of vertical lines 802. In one embodiment, the blocks contain 1×7 vertical lines.

The control wedge 800 also includes a small oval 801 on the right side that is used to test focus. In one embodiment, the focus test pattern of FIG. 9 is used to fill the oval. The correct focus is found at the point where the oval appears the darkest. In this embodiment, the background of the sensor is empty. The highest contrast sensor indicates the sharpest focus. In another embodiment, a focus sensor has a non-empty background, and when the sensor is null, the focus is the sharpest. In one embodiment, the focus target is not imaged during a power sweep, described below, to avoid confusion. To the right of the focus target 801, the control wedge 800 includes the focus setting 806.

As shown in FIG. 12, an array of control wedges, generally 810, is referred to as a power sweep. The power sweep is an array of wedges, with each wedge imaged at a different power setting. The power settings shown on the left side of the wedges 805A–805F, are incremented by three. A power sweep is useful for finding the ideal exposure setting, as described above with regard to the sensor array.

Figure 13:
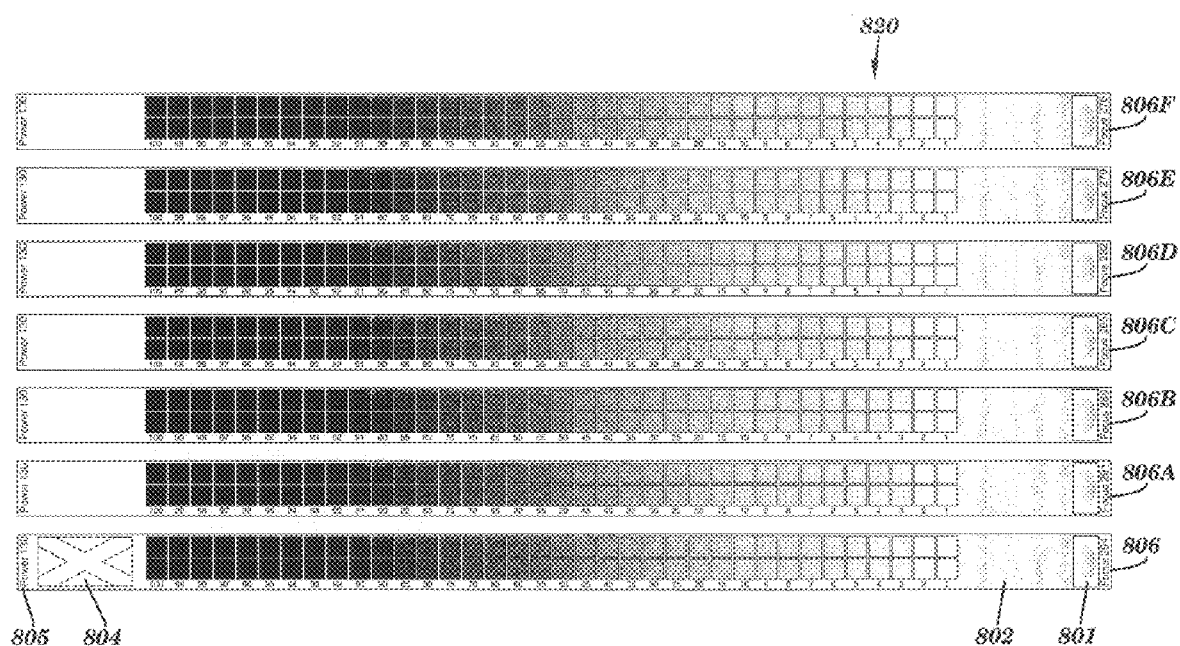
FIG. 13 is an embodiment of a control wedge including a visual sensor according to the present invention.

Referring to FIG. 13, an array of control wedges, generally 820, is referred to as a focus sweep. The focus sweep is an array of wedges, with each wedge imaged at a different focus setting. The focus settings are shown on the right side of the wedges 806A–F as incremented by three. A focus sweep is useful for finding the ideal focus setting, as described above with regard to the sensor array.

It is useful to calibrate a proofer such as the POLAPROOF proofer, by first setting the focus with an estimated intensity, and then setting the intensity once the focus has been set, that is by first running a focus sweep and then running a power sweep. In one embodiment, a software program running on a front end 40 (FIG. 2) receives input from a user regarding the parameter settings for a focus sweep and a power sweep. The software receives input from a user regarding which parameters to be swept, e.g. a focus sweep or a power sweep. The front end software then prepares an image of a control wedge 800 which incorporates the appropriate visual sensors, e.g. exposure or power sensor 804, or focus sensor 801, corresponding to the selected sweep parameters. To avoid confusion after the visual sensors have been recorded onto a recording medium, only the visual sensors corresponding to the imaging parameter being swept during the recording of the control wedge 800 may be included in the control wedge image prepared by the front end. Thus if a focus sweep is selected by the operator, the front end software may only include the visual sensor designed for evaluating focus, e.g., visual sensor 801 as shown in FIG. 13, while not including the visual sensor for other parameters, e.g. the exposure sensor 804. Conversely in FIG. 12 only the exposure sensor 804 is included in the control wedge 800 since only exposure is being swept by the recording device.

In operation a plurality of visual sensor images may be stored on the front end as digital files. The files may also be stored on a RIP 34 or on the recording device. These may comprise visual sensors for giving a visual indication of change in, or a null in, a particular image recording parameter and each type of visual sensor may include variations corresponding to the recording resolution of image recorder, the type of media used, e.g. film or plate or paper, the type of recorder, e.g. photographic, thermal or electro-photographic, the selected recorder screening parameters, e.g. frequency of amplitude modulated screens, the recording dot shape or size, e.g. square or elliptical, the type of media processor, e.g. chemical, mechanical or thermal or a variety of other image recording parameters. The front end software may include a menu for selecting these parameters as well as for selecting which imaging parameter of the recording device are to be swept and based on those selections the front end software may then build one or more control wedge images which includes the appropriate visual sensors for providing the sweep or other visual image test which may be designated by the operator.

Having prepared a control wedge file, the front end software may perform screening, color separating or other processing steps to the control wedge image before sending the control wedge image to a RIP 34 (FIG. 2) for raster processing. The RIP then provides a bit map which is readable by the recording device to be tested. The processed RIP file may also include specific sweep instructions e.g. which parameter to sweep and or the start and end values of the sweep parameter such that a sweep can be automatically performed by the image recorder.

The control wedge may also include printed information or data fields for providing dates, equipment type, sweep values, operator name, screening and resolution settings or a host of other qualifying data. Such information may also be input by an operator at the front end or automatically inserted into the control wedge image by the software running on the front end.

Variations, modifications, and other implementations of the visual sensors described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A visual sensor, comprising:
   a first portion having a first imaging characteristic; and
   a second portion proximate to the first portion having a second imaging characteristic;
   wherein the imaging characteristic of one of the first and second portions is less sensitive to an imaging parameter than the imaging characteristic of the other of the first and second portions, such that the imaging characteristic of the first portion and the second portion appear substantially similar for at least one imaging parameter setting range and appear different otherwise, and wherein one of the first and second portions comprises a symbol and the other of the first and second portions comprises a background, the symbol chosen to provide information related to the at least one imaging parameter setting range.

2. The visual sensor of claim 1 wherein one of the first and second portions comprises a coarse tint and the other of the first and second portions comprises a fine tint.

3. The visual sensor of claim 2 wherein the coarse tint is a (n×n) periodic pattern and the fine tint is a (m×m) periodic pattern such that (n>m).

4. The visual sensor of claim 1 wherein the imaging parameter is at least one parameter chosen from the set of exposure setting, pulse width modulation, focus, balance, spot size, spot shape, spot ellipticity, sidelobes size, sidelobes shape, sidelobes intensity, media gamma, edge sharpness, dot gain, uniformity, ink receptivity of plate material, physical media changes, pattern dependent effects, sensitivity to position errors, and sensitivity to exposure errors.

5. The visual sensor of claim 1 wherein the first and second imaging characteristics each comprise one or more characteristics chosen from the set of density, tint, color, reflectivity, absorption, granularity, microstructure, size, shape, distribution, randomness, structure, shape, edge sharpness, and depth.

6. The visual sensor of claim 1 wherein the symbol comprises at least one alphanumeric character.

7. The visual sensor of claim 1 wherein the symbol comprises a shape chosen from the set of arrow, circle, square, rectangle, triangle, diamond, pentagon, and octagon.

8. A method for imaging a visual sensor, comprising the steps of:
    defining an image having a first portion and a second portion proximate to the first portion, the first portion having a first imaging characteristic, the second portion having a second imaging characteristic such that one of the first and second portions is less sensitive to an imaging parameter than the other of the first and second portions, wherein one of the first and second portions comprises a symbol and the other of the first and second portions comprises a background, the symbol chosen to provide information related to the at least one imaging parameter setting range;
    imaging said image such that the first portion and the second portion appear substantially similar for at least one desired imaging parameter setting range and appear different otherwise.

9. The method of claim 8 wherein one of the first and second portions comprises a coarse tint and the other of the first and second portions comprises a fine tint.

10. The method of claim 9 wherein the coarse tint is a (n×n) periodic pattern and the fine tint is a (m×m) periodic pattern such that (n>m).

11. The method of claim 8 wherein the imaging parameter is at least one parameter chosen from the set of exposure setting, pulse width modulation, focus, balance, spot size, spot shape, spot ellipticity, sidelobes size, sidelobes shape, sidelobes intensity, media gamma, edge sharpness, dot gain, uniformity, ink receptivity of plate material, physical media changes, pattern dependent effects, sensitivity to position errors, and sensitivity to exposure errors.

12. The method of claim 8 wherein the first and second imaging characteristics each comprise one or more characteristics chosen from the set of density, tint, color, reflectivity, absorption, granularity, microstructure, size, shape, distribution, randomness, structure, shape, edge sharpness, and depth.

13. The method of claim 8 wherein the symbol comprises at least one alphanumeric character.

14. The method of claim 8 wherein the symbol comprises a shape chosen from the set of arrow, circle, square, rectangle, triangle, diamond, pentagon, and octagon.

15. An array of visual sensors, comprising:
    a plurality of visual sensors, each sensor comprising:
        a first portion having a first imaging characteristic;
        a second portion proximate to the first portion having a second imaging characteristic;
        wherein the imaging characteristic of one of the first and second portions is less sensitive to an imaging parameter than the imaging characteristic of the other of the first and second portions, such that the imaging characteristic of the first portion and the second portion appear substantially similar for at least one imaging parameter setting range and appear different otherwise;
        wherein one of the first and second portions comprises a symbol chosen to provide information related to the at least one imaging parameter setting range and the other of the first and second portions comprises a background;
        wherein at least two of the plurality of visual sensors are imaged at at least two different imaging parameter settings.

16. The array of visual sensors of claim 15 wherein one of the first and second portions comprises a coarse tint and the other of the first and second portions comprises a fine tint.

17. The array of visual sensors of claim 16 wherein the coarse tint is a (n×n) periodic pattern and the fine tint is a (m×m) periodic pattern such that (n>m).

18. The array of visual sensors of claim 15 wherein the imaging parameter is at least one parameter chosen from the set of exposure setting, pulse width modulation, focus, balance, spot size, spot shape, spot ellipticity, sidelobes size, sidelobes shape, sidelobes intensity, media gamma, edge sharpness, dot gain, uniformity, ink receptivity of plate material, physical media changes, pattern dependent effects, sensitivity to position errors, and sensitivity to exposure errors.

19. The array of visual sensors of claim 15 wherein the first and second imaging characteristics each comprise one or more characteristics chosen from the set of density, tint, color, reflectivity, absorption, granularity, microstructure, size, shape, distribution, randomness, structure, shape, edge sharpness, and depth.

20. A method for imaging an array of sensors, comprising the steps of:
    imaging a sensor by defining an image having a first portion and a second portion proximate to the first portion, the first portion having a first imaging characteristic, the second portion having a second imaging characteristic such that one of the first and second portions is less sensitive to an imaging parameter than the other of the first and second portions, and imaging said image such that the first portion and the second portion appear substantially similar for at least one desired imaging parameter setting range and appear different otherwise, wherein one of the first and second portions comprises a symbol chosen to provide information related to the at least one imaging parameter setting range and the other of the first and second portions comprises a background;
    modifying the imaging parameter after the sensor is imaged; and repeating the imaging and modifying steps for a range of imaging parameter values.

21. The method of claim 20 wherein one of the first and second portions comprises a coarse tint and the other of the first and second portions comprises a fine tint.

22. The method of claim 21 wherein the coarse tint is a (n×n) periodic pattern and the fine tint is a (m×m) periodic pattern such that (n>m).

23. The method of claim 20 wherein the imaging parameter is at least one parameter chosen from the set of exposure setting, pulse width modulation, focus, balance, spot size, spot shape, spot ellipticity, sidelobes size, sidelobes shape, sidelobes intensity, media gamma, edge sharpness, dot gain, uniformity, ink receptivity of plate material, physical media changes, pattern dependent effects, sensitivity to position errors, and sensitivity to exposure errors.

24. The method of claim 20 wherein the first and second imaging characteristics each comprise one or more characteristics chosen from the set of density, tint, color, reflectivity, absorption, granularity, microstructure, size, shape, distribution, randomness, structure, shape, edge sharpness, and depth.

25. A control wedge comprising:
a plurality of blocks filled with different grayscale halftones; and
a visual sensor, comprising:
a first portion having a first imaging characteristic; and
a second portion proximate to the first portion having a second imaging characteristic;
wherein the imaging characteristic of one of the first and second portions is less sensitive to an imaging parameter than the imaging characteristic of the other of the first and second portions, such that the imaging characteristic of the first portion and the second portion appear substantially similar for at least one imaging parameter setting range and appear different otherwise, and wherein one of the first and second portions comprises a symbol and the other of the first and second portions comprises a background, the symbol chosen to provide information related to the at least one imaging parameter setting range.

26. A system for imaging a control wedge, comprising;
a front end which including a processor having a software program operating thereon, a storage device for storing and processing image files for building an image of the control wedge and an operator interface device for allowing an operator to select one or parameters for recording the image of the control wedge onto a recording medium;
a device for preparing a bit map representation of the image of the control wedge for driving a recording device for recording the image of the control wedge onto a recording medium;
a first region of the control wedge including a first visual sensor for providing a visual indication in response to changes in a first recording parameter;
a second region of the control wedge including a second visual sensor for providing a visual indication in response to changes in a second recording parameter; and
wherein upon selecting one of said first recording parameter or said second recording parameter only the visual sensor corresponding to a selected recording parameter is included in the control wedge image.

27. A visual sensor for optimizing focus, comprising:
a first portion having a first imaging characteristic, the first imaging characteristic comprising a coarse tint, and a second portion proximate to the first portion having a second imaging characteristic, the second imaging characteristic comprising a cell size of 4×4 pixels with opposing diagonal lines and a frequency of 1-on and 3-off and wherein said first portion is substantially rectangular and wherein said second portion is substantially contained with said first portion, wherein the imaging characteristic of one of the first and second portions is less sensitive to an imaging parameter than the imaging characteristic of the other of the first and second portions, such that the imaging characteristic of the first portion and the second portion appear substantially similar for at least one imaging parameter setting range and appear different otherwise.

* * * * *